US011671872B2

(12) United States Patent
Sato et al.

(10) Patent No.: US 11,671,872 B2
(45) Date of Patent: *Jun. 6, 2023

(54) COMMUNICATION SYSTEM AND TRANSMISSION APPARATUS

(71) Applicant: SONY GROUP CORPORATION, Tokyo (JP)

(72) Inventors: Hiroki Sato, Kanagawa (JP); Kensaku Wakuda, Kanagawa (JP); Tomoaki Matsumura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,933

(22) Filed: Sep. 15, 2021

(65) Prior Publication Data

US 2022/0007233 A1 Jan. 6, 2022

Related U.S. Application Data

(63) Continuation of application No. 16/625,334, filed as application No. PCT/JP2018/022859 on Jun. 15, 2018, now Pat. No. 11,146,991.

(30) Foreign Application Priority Data

Jun. 29, 2017 (JP) .............................. JP2017-127551

(51) Int. Cl.
*H04W 28/08* (2023.01)
*H04W 28/02* (2009.01)
*H04W 40/12* (2009.01)

(52) U.S. Cl.
CPC ..... *H04W 28/085* (2013.01); *H04W 28/0268* (2013.01); *H04W 28/0967* (2020.05); *H04W 40/12* (2013.01)

(58) Field of Classification Search
CPC .......... H04W 28/085; H04W 28/0268; H04W 28/0967; H04W 40/12
See application file for complete search history.

(56) References Cited

U.S. PATENT DOCUMENTS 6,631,122 B1  10/2003  Arunachalam et al.
8,705,527 B1 *  4/2014  Addepalli ............... H04L 67/12
370/389

(Continued)

FOREIGN PATENT DOCUMENTS

EP  3 136 742 B1  5/2020
JP  2000-216815 A  8/2000

(Continued)

OTHER PUBLICATIONS

"MPEG Video Steaming Solution for Multihomed-Terminals in Heterogeneous Wireless Networks," The 10th Annual IEEE CCNC-Work-In-Progress, 2013, pp. 677-682.

(Continued)

*Primary Examiner* — Kevin D Mew
(74) *Attorney, Agent, or Firm* — Oblon, McClelland, Maier & Neustadt, L.L.P.

(57) ABSTRACT

A communication system comprises a transmission apparatus configured to transmit data via a plurality of communication lines, and a reception apparatus configured to receive the data from the transmission apparatus. The transmission apparatus includes processing circuitry configured to generate information regarding QoS of the plurality of communication lines. The processing circuitry is further configured to designate assignment of the data to communication lines of the plurality of communication lines on a basis of at least (i) the information regarding the QoS of the plurality of communication lines and (ii) assignment information indicating an assignment status of a data amount and a communication line transferred in the past. The transmission (Continued)

apparatus includes communication circuitry configured to allocate and transmit the data to the assigned communication lines of the plurality of communication lines on a basis of an instruction from the processing circuitry.

20 Claims, 16 Drawing Sheets

(56) References Cited

U.S. PATENT DOCUMENTS

| | | | |
|---|---|---|---|
| 8,831,566 B2 * | 9/2014 | Liu | H04W 28/0231 |
| | | | 370/328 |
| 9,763,130 B1 * | 9/2017 | Singh | H04W 28/0289 |
| 9,806,988 B2 | 10/2017 | Kaplan et al. | |
| 2002/0061008 A1 | 5/2002 | Lysejko et al. | |
| 2004/0168204 A1 | 8/2004 | Choe | |
| 2006/0133295 A1 | 6/2006 | Sakai et al. | |
| 2007/0291774 A1 | 12/2007 | Herz et al. | |
| 2009/0086754 A1 | 4/2009 | Mack-Crane et al. | |
| 2009/0285098 A1 | 11/2009 | Qi | |
| 2010/0130170 A1 * | 5/2010 | Liu | H04W 64/00 |
| | | | 455/418 |
| 2010/0329272 A1 | 12/2010 | Tsuboi et al. | |
| 2011/0164503 A1 | 7/2011 | Yong et al. | |
| 2011/0225311 A1 * | 9/2011 | Liu | H04L 45/125 |
| | | | 709/231 |
| 2011/0225312 A1 * | 9/2011 | Liu | H04N 21/632 |
| | | | 709/231 |
| 2013/0336199 A1 * | 12/2013 | Schwartz | H04W 76/12 |
| | | | 370/315 |
| 2014/0155080 A1 | 6/2014 | Austin et al. | |
| 2014/0334318 A1 | 11/2014 | Pica et al. | |
| 2015/0223114 A1 * | 8/2015 | Tian | H04W 8/04 |
| | | | 370/235 |
| 2015/0312838 A1 * | 10/2015 | Torres | H04L 65/1069 |
| | | | 370/329 |
| 2016/0049996 A1 | 2/2016 | Wang | |
| 2016/0095132 A1 | 3/2016 | Hodroj et al. | |
| 2016/0119939 A1 | 4/2016 | Himayat et al. | |
| 2016/0261516 A1 * | 9/2016 | Gopinathan | H04L 47/127 |
| 2016/0262044 A1 * | 9/2016 | Calin | H04L 47/2483 |
| 2017/0171895 A1 | 6/2017 | Kandagadla | |
| 2017/0180244 A1 | 6/2017 | Hodroj | |
| 2017/0188391 A1 * | 6/2017 | Rajagopal | H04W 28/0284 |
| 2017/0318484 A1 | 11/2017 | Lindheimer et al. | |
| 2017/0347363 A1 * | 11/2017 | Roy | H04B 7/1851 |

FOREIGN PATENT DOCUMENTS

| | | | | |
|---|---|---|---|---|
| JP | 2002-314584 A | 10/2002 | | |
| JP | 2003309594 A | 10/2003 | | |
| JP | 2008-113224 A | 5/2008 | | |
| JP | 2014-241493 A | 12/2014 | | |
| WO | WO-2016168603 A1 * | 10/2016 | | H04L 41/12 |
| WO | WO-2016202385 A1 * | 12/2016 | | H04L 45/38 |

OTHER PUBLICATIONS

The partial Supplementary European Search Report dated May 12, 2020, in Patent Application No. 18824531.0, citing documents AC, AD and AZ therein, 14 pages.

Toshihiro Shikama, et al. "A Multilink Protocol with the Per Flow Resequencing and Its Performance Evaluation" Proceedings of the 2007 IEEE International Conference on Communications (ICC 2007), XP031125728, Jun. 2007, pp. 542-549.

* cited by examiner

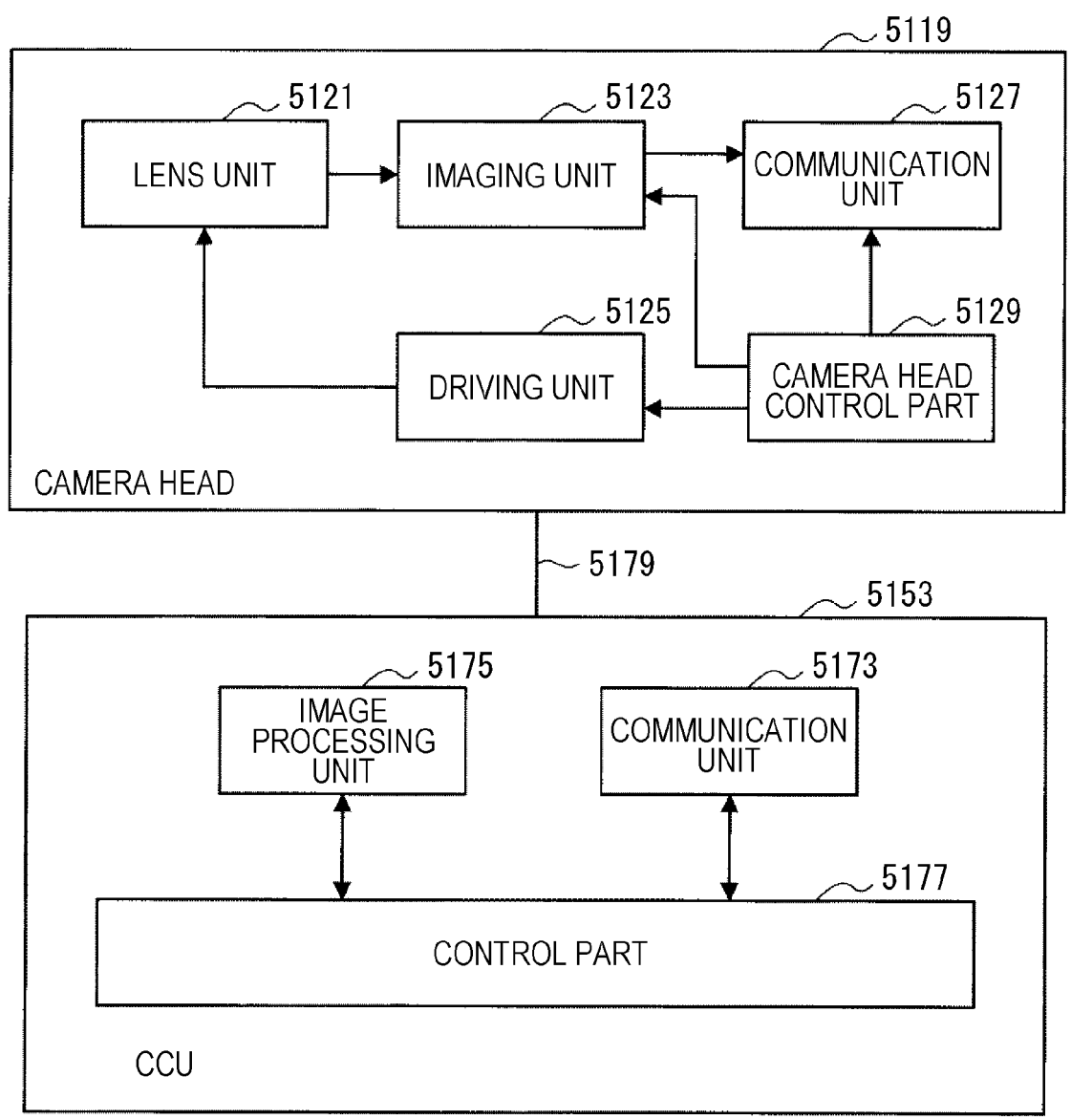

COMMUNICATION SYSTEM AND TRANSMISSION APPARATUS

CROSS-REFERENCE TO RELATED APPLICATIONS

This application is a continuation of and claims priority to U.S. patent application Ser. No. 16/625,334, filed Dec. 20, 2019, the entire contents of which are incorporated herein by reference. Application Ser. No. 16/625,334 is a National Stage Application of International Application No. PCT/JP2018/022859, filed Jun. 15, 2018, which claims priority to Japanese Patent Application No. 2017-127551, filed Jun. 29, 2017. The benefit of priority is claimed to each of the foregoing.

TECHNICAL FIELD

The present technology relates to a communication system and a transmission apparatus, and more particularly to a communication system and a transmission apparatus that enable streaming using a plurality of wireless communication lines.

BACKGROUND ART

Conventionally, there are diverse communication systems using a wireless communication path.

For example, Patent Document 1 discloses a system that performs communication by using a plurality of different wireless communication paths and supplementing a shortage of bandwidth in one wireless communication path with another wireless communication path.

Furthermore, in recent years, many video distribution systems that distribute moving images being captured in real time by wireless communication have been put into practical use.

CITATION LIST

Patent Document

Patent Document 1: Japanese Patent Application Laid-Open No. 2008-113224

SUMMARY OF THE INVENTION

Problems to be Solved by the Invention

However, the system disclosed in Patent Document 1 is premised on telephonic sound communication, and the configuration of Patent Document 1 cannot always be applied to a video distribution system.

The present technology has been made in view of such a situation, and makes it possible to perform highly reliable streaming using a plurality of wireless communication lines.

Solutions to Problems

The communication system of the present technology includes: a transmission apparatus that transmits data via a plurality of communication lines; and a reception apparatus that receives the data from the transmission apparatus, in which the transmission apparatus includes: a quality of service (QoS) module that generates information regarding QoS of the plurality of communication lines; a load balancer that designates assignment of the data to the communication lines on the basis at least of the information regarding QoS; and a caster that allocates and transmits the data to the assigned communication lines on the basis of an instruction from the QoS module.

The transmission apparatus of the present technology includes: a QoS module that generates information regarding QoS of a plurality of communication lines; a load balancer that designates assignment of data to the communication lines on the basis at least of the information regarding QoS; and a caster that allocates and transmits the data to the assigned communication lines on the basis of an instruction from the QoS module.

In the present technology, information regarding QoS of a plurality of communication lines is generated, assignment of data to the communication lines is designated on the basis at least of the information regarding QoS, and the data is allocated and transmitted to the assigned communication lines on the basis of an instruction from the QoS module.

Effects of the Invention

According to the present technology, it is possible to perform highly reliable streaming using a plurality of wireless communication lines.

Note that the effects described herein are not necessarily limited and any effects described in the present disclosure may be applied.

BRIEF DESCRIPTION OF DRAWINGS

FIG. 16 is a block diagram illustrating an example of functional configurations of a camera head and a camera control unit (CCU) illustrated in FIG. 15.

MODE FOR CARRYING OUT THE INVENTION

Modes for carrying out the present disclosure (hereinafter, referred to as embodiments) will be described below. Note that the description will be given in the following order.
1. Configuration and Working of Communication System
2. Recovery Determination for Link
3. Retransmission of Data
4. Transmission of Stationary Packet in Buffer
5. Variations
6. Application Examples

1. Configuration and Working of Communication System (Configuration Example of Communication System)

Figure 1:
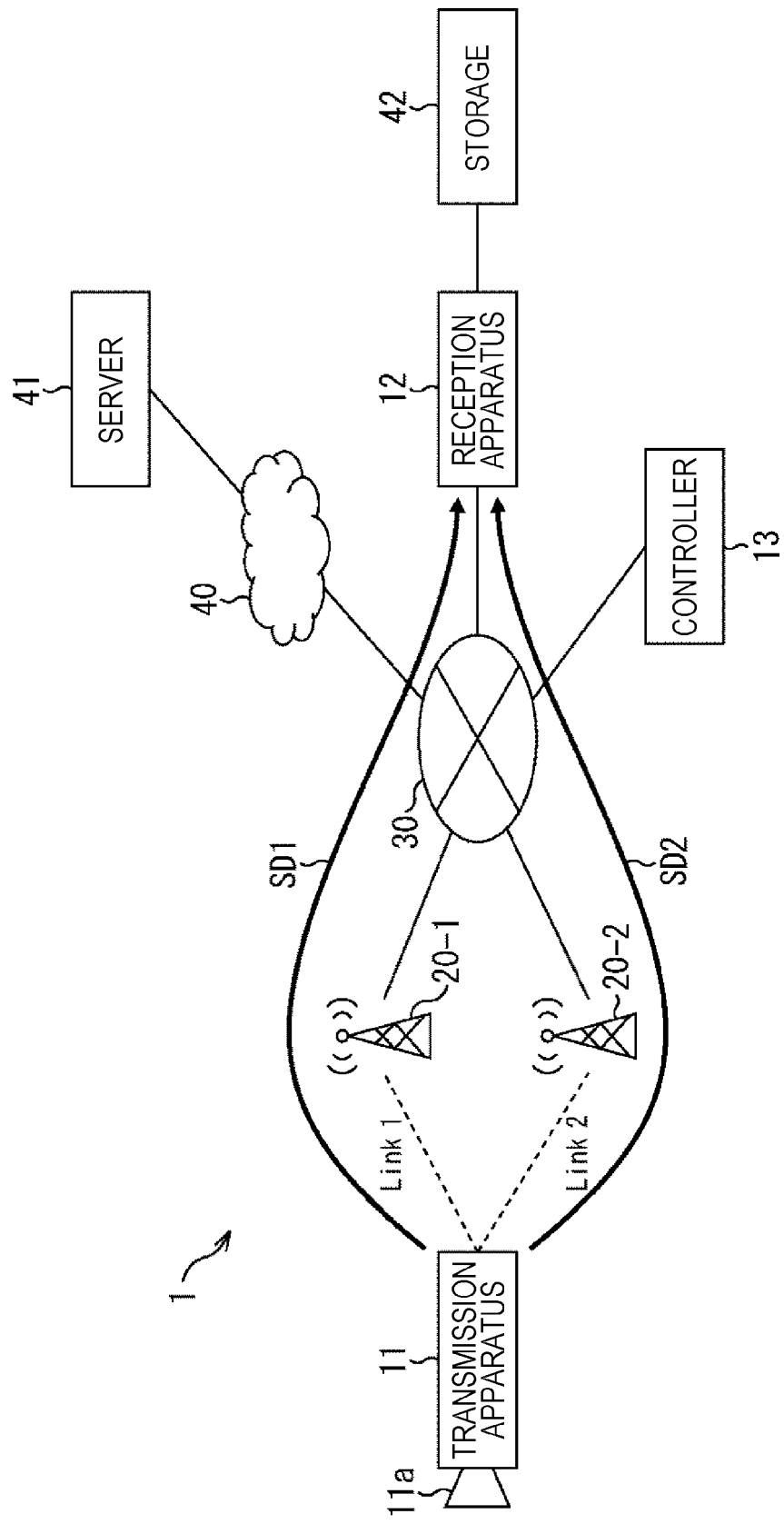
FIG. 1 is a diagram illustrating a configuration example of a communication system according to the present embodiment.

FIG. 1 is a diagram illustrating a configuration example of a communication system according to the present embodiment.

In the communication system 1 in FIG. 1, a moving image being captured by a transmission apparatus 11 is transmitted to a reception apparatus 12 in real time by the transmission apparatus 11 performing streaming using a user datagram protocol (UDP).

The transmission apparatus 11 is configured as, for example, an imaging apparatus such as a camcorder and transmits data of a moving image (moving image data) captured by an imaging unit 11a to the reception apparatus 12 in real time. Note that the transmission apparatus 11 and the imaging apparatus may be configured apart from each other.

The reception apparatus 12 is configured as, for example, a streaming receiver provided in a broadcasting station for television broadcasting, and receives moving image data transmitted from the transmission apparatus 11. The moving image data received by the reception apparatus 12 is distributed by broadcast waves.

The transmission apparatus 11 and the reception apparatus 12 are connected via a network including a first communication line including a wireless communication line and a second communication line constituted only by a wired communication line.

The first communication line mentioned here is assumed to refer to a communication line between the transmission apparatus 11 and the Internet 30 via base stations 20-1 and 20-2, and the second communication line is assumed to refer to a communication line between the Internet 30 and the reception apparatus 12.

The transmission apparatus 11 is connected to the base station 20-1 by a first wireless communication line (link 1), and is connected to the base station 20-2 by a second wireless communication line (link 2). For example, communication in compliance with the 3rd generation (3G) or long term evolution (LTE) scheme is performed between the transmission apparatus 11 and the base station 20-1, and between the transmission apparatus 11 and the base station 20-2. Note that, in the following, the entire communication path by way of the link 1 is also referred to as link 1, and the entire communication path by way of the link 2 is also referred to as link 2 in some cases.

The transmission apparatus 11 performs streaming by bonding using the link 1 and the link 2, thereby being able to split moving image data obtained by capturing into data SD1 and data SD2 to transmit. Although details will be described later, streaming is performed between the transmission apparatus 11 and the reception apparatus 12 by performing quality of service (QoS) control.

A controller 13 is connected to the Internet 30. The controller 13 is provided, for example, in a broadcasting station for television broadcasting similarly to the reception apparatus 12.

The controller 13 is a control apparatus that manages the state of a network including a communication line between the transmission apparatus 11 and the Internet 30 (first communication line) and a communication line between the Internet 30 and the reception apparatus 12 (second communication line). For example, the controller 13 manages the state of streaming between the transmission apparatus 11 and the reception apparatus 12 through a transmission control protocol (TCP) connection.

Note that it is only necessary that the connection to the network constituting the communication system 1 is established and, as illustrated in FIG. 1, connecting to the Internet 30 alone or being provided on a cloud 40 may be adopted. Furthermore, in the controller 13, the controller 13 may be configured to be integrated with the reception apparatus 12 or may be configured to be integrated with the transmission apparatus 11.

Moreover, a server 41 on the cloud 40 is connected to the Internet 30. Moving image data received by the reception apparatus 12 can be distributed by way of the Internet 30 by the server 41 on the cloud 40.

Furthermore, moving image data received by the reception apparatus 12 may be saved in a storage 42 connected to the reception apparatus 12, for example, in a broadcasting station.

(Configuration Example of Transmission Apparatus)

Figure 2:
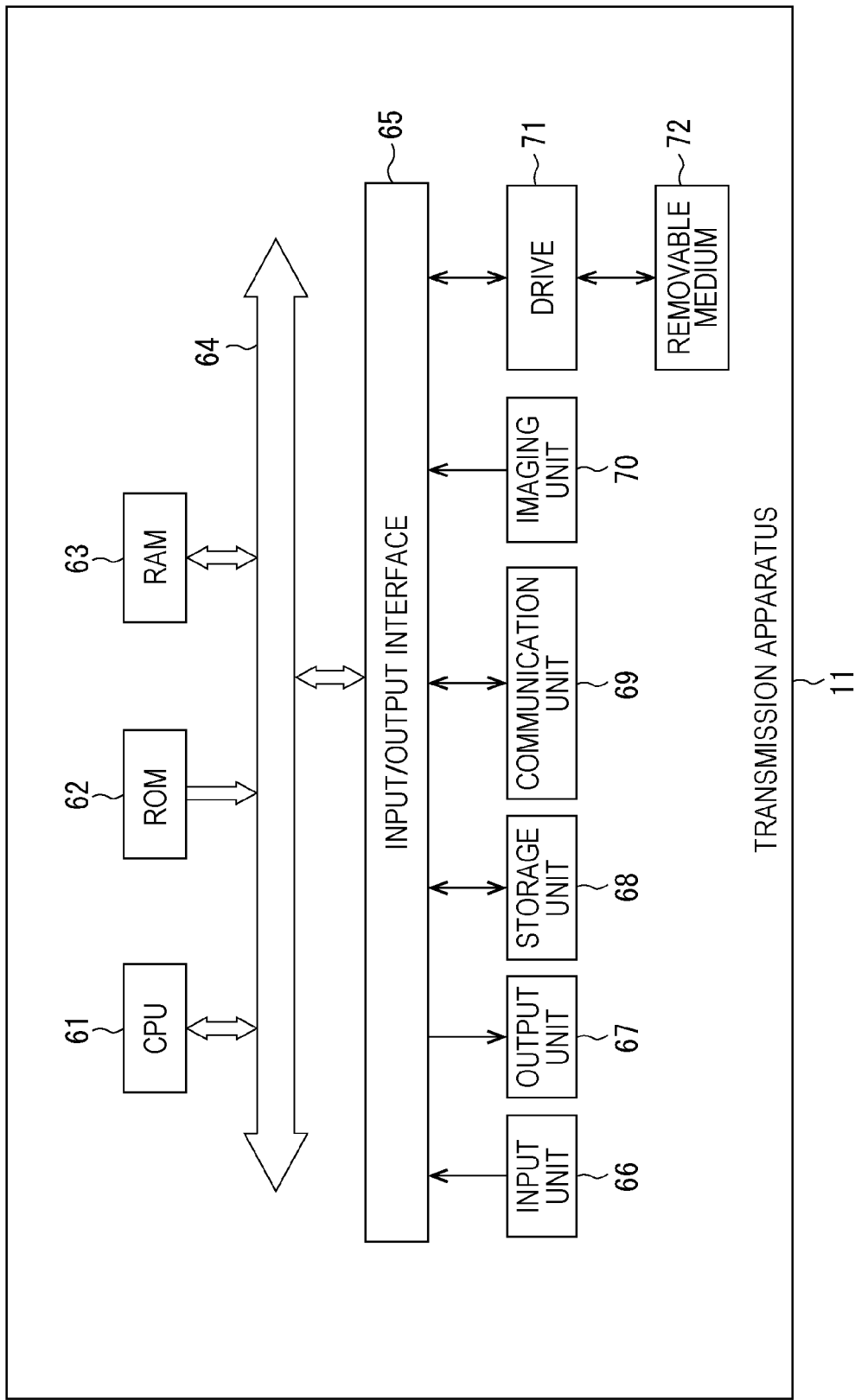
FIG. 2 is a block diagram illustrating a configuration example of a transmission apparatus.

FIG. 2 is a block diagram illustrating a configuration example of the transmission apparatus 11.

In the transmission apparatus 11 in FIG. 2, a central processor unit (CPU) 61 executes processes for implementing various functions included in the transmission apparatus 11 in accordance with a program stored in a read only memory (ROM) 62 or a program loaded in a random access memory (RAM) 63. Data required by the CPU 61 when executing the various processes, and the like are also appropriately stored in the RAM 63.

The CPU 61, the ROM 62, and the RAM 63 are mutually connected via a bus 64. Furthermore, an input/output interface 65 is connected to this bus 64.

An input unit 66, an output unit 67, a storage unit 68, a communication unit 69, and an imaging unit 70 are connected to the input/output interface 65.

The input unit 66 is configured from a key, a button, a touch panel, a microphone, and the like, and the output unit 67 is configured from a display, a speaker, and the like. The storage unit 68 is configured from a hard disk or the like, and the communication unit 69 is configured from an antenna or the like that performs various types of wireless communication.

The imaging unit 70 corresponds to the imaging unit 11a in FIG. 1 and is configured from a complementary metal oxide semiconductor (CMOS) image sensor or the like.

Furthermore, a drive 71 is connected to the input/output interface 65 as necessary, and a removable medium 72 configured from a semiconductor memory or the like is appropriately attached. A computer program read from the removable medium 72 is installed in the storage unit 68 as necessary.

Note that the configurations of the reception apparatus 12 and the controller 13 are basically similar to the configuration of the transmission apparatus 11 in FIG. 2 except that the imaging unit 70 is not included, and thus description thereof will be omitted.

(Functional Configuration Examples of Transmission Apparatus and Reception Apparatus)

Figure 3:
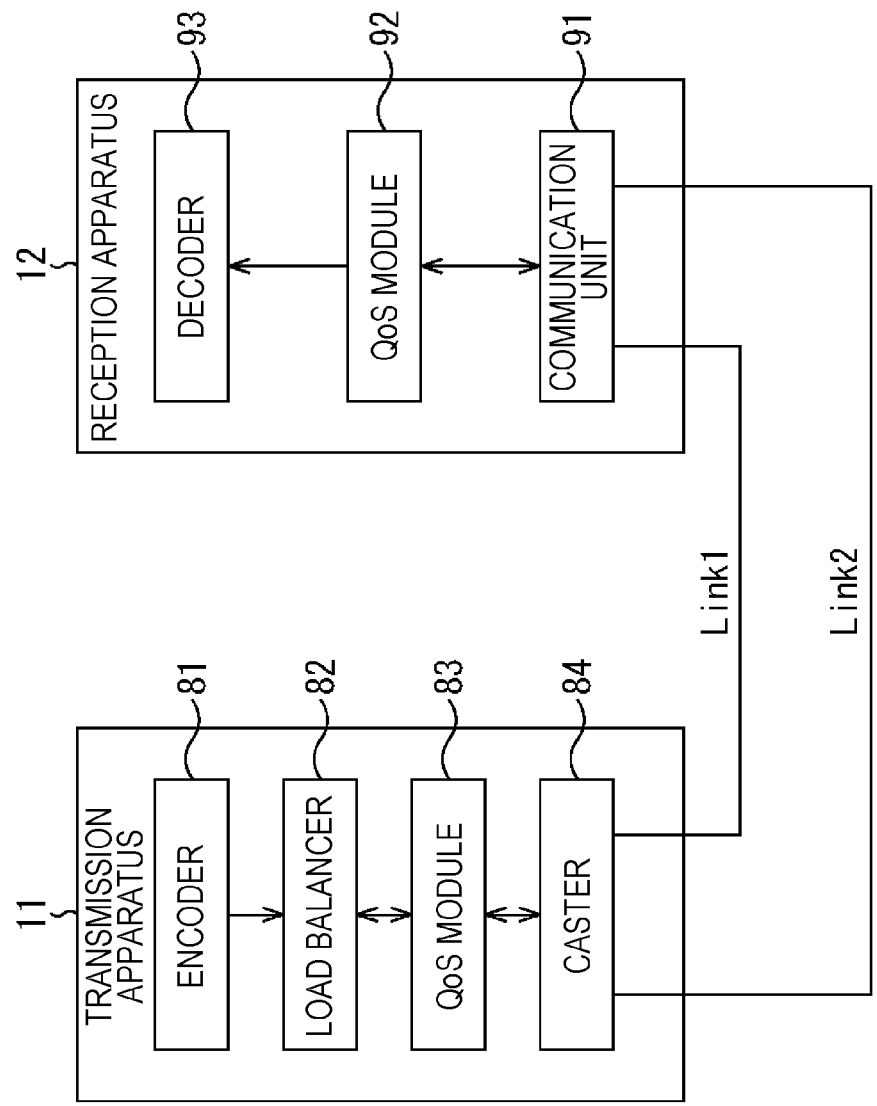
FIG. 3 is a block diagram illustrating a functional configuration example of a transmission apparatus and a reception apparatus.

Next, functional configuration examples of the transmission apparatus 11 and the reception apparatus 12 will be described with reference to FIG. 3.

The transmission apparatus 11 includes an encoder 81, a load balancer 82, a QoS module 83, and a caster 84.

The encoder 81 encodes moving image data obtained by the imaging unit 70, and generates data in units of groups of picture (GOPs) each constituted by an I frame and a P frame. Note that one GOP is assumed to be constituted by the I and P frames in the present embodiment, but may be constituted by I, P, and B frames.

For example, the load balancer 82 designates assignment of each frame generated by the encoder 81 to the link 1 and the link 2 on the basis of QoS information to be described later.

The QoS module 83 implements QoS control with the reception apparatus 12.

For example, the QoS module 83 generates QoS information regarding QoS of each of the links 1 and 2 on the basis of feedback information about each of the links 1 and 2 from the reception apparatus 12, and notifies the load balancer 82 of the QoS information. Furthermore, the QoS module 83 instructs the caster 84 to transmit each frame assigned to the link 1 or 2 by the load balancer 82.

On the basis of the instruction from the QoS module 83, the caster 84 allocates each individual frame to the assigned link 1 or 2 and transmits the allocated frame to the reception apparatus 12 in units of packets. Note that, in streaming by UDP, packets constituting each frame are transmitted in an arbitrary order.

Meanwhile, the reception apparatus 12 includes a communication unit 91, a QoS module 92, and a decoder 93.

The communication unit 91 receives packets transmitted from the transmission apparatus 11 via the links 1 and 2, and supplies the received packets to the QoS module 92.

The QoS module 92 implements QoS control with the transmission apparatus 11.

For example, the QoS module 92 generates the feedback information about each of the links 1 and 2 with respect to predetermined packets transmitted from the transmission apparatus 11 via the links 1 and 2, and causes the communication unit 91 to transmit the generated feedback information.

The QoS module 92 has a frame buffer therein and outputs a packet group in units of frames to the decoder 93 in accordance with the output timing of the frame.

The decoder 93 generates moving image data by decoding each frame output from the QoS module 92.

(Working of Transmission Apparatus)

Figure 4:
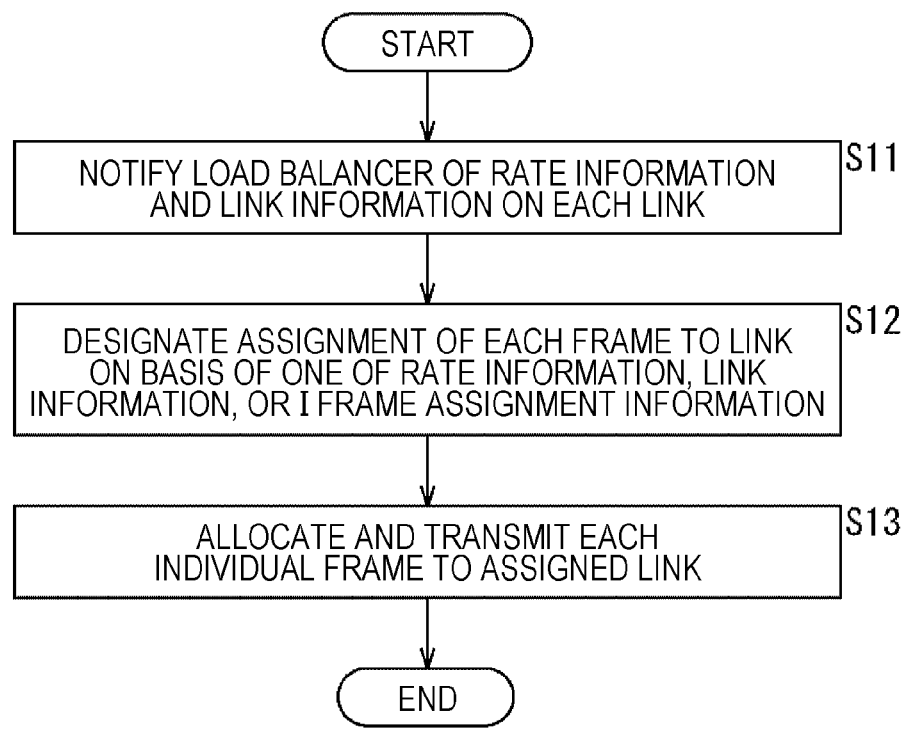
FIG. 4 is a flowchart for explaining a data transmission process.

Next, a transmission process by the transmission apparatus 11 will be described with reference to a flowchart in FIG. 4. The process in FIG. 4 is started, for example, when the caster 84 receives the feedback information about each of the links 1 and 2 from the reception apparatus 12.

In step S11, the QoS module 83 generates rate information and link information of each link as QoS information on the basis of the feedback information about each link, and notifies the load balancer 82 of the generated information.

Here, the rate information is information indicating the communication rate of each of the links 1 and 2, and the link information is an evaluation index that designates whether or not the concerned link is available, which is defined thoroughly on the basis of the bandwidth, the packet loss rate, the round-trip transmission time, and the like of each of the links 1 and 2.

In step S12, the load balancer 82 designates assignment of each frame generated by the encoder 81 to the links 1 and 2, using a rate estimated by automatic rate control (ARC) as a reference, on the basis of at least one of the rate information or the link information from the QoS module 83 or I frame assignment information.

The I frame assignment information is information indicating the assignment status to each link of the I frame having a larger data amount among the I and P frames. The I frame assignment information also includes information indicating the assignment status of past I frames to each link.

According to the I frame assignment information, it is possible to prevent the I frame having a larger data amount from being assigned unevenly to one link. Furthermore, according to the rate information and link information, frames can be assigned according to the status of each link.

Note that, at this time, the QoS module 83 instructs the caster 84 to transmit each frame assigned to each link by the load balancer 82.

Then, in step S13, on the basis of the instruction from the QoS module 83, the caster 84 allocates each individual frame to the assigned link 1 or 2 and transmits the allocated frame to the reception apparatus 12 in units of packets.

According to the above process, since QoS control is properly performed by the QoS module 83, it becomes possible to perform highly reliable streaming by bonding using a plurality of wireless communication lines even in the case of streaming by UDP.

2. Recovery Determination for Link

In the communication system 1 described above, there are cases where one of a plurality of links become unusable during bonding. In this case, it is necessary to stop assigning a frame to the unusable link. In the following, a technique of determining the recovery of a link for which assignment of a frame has been stopped will be described.

(Outline of Recovery Determination for Link)

Figure 5:
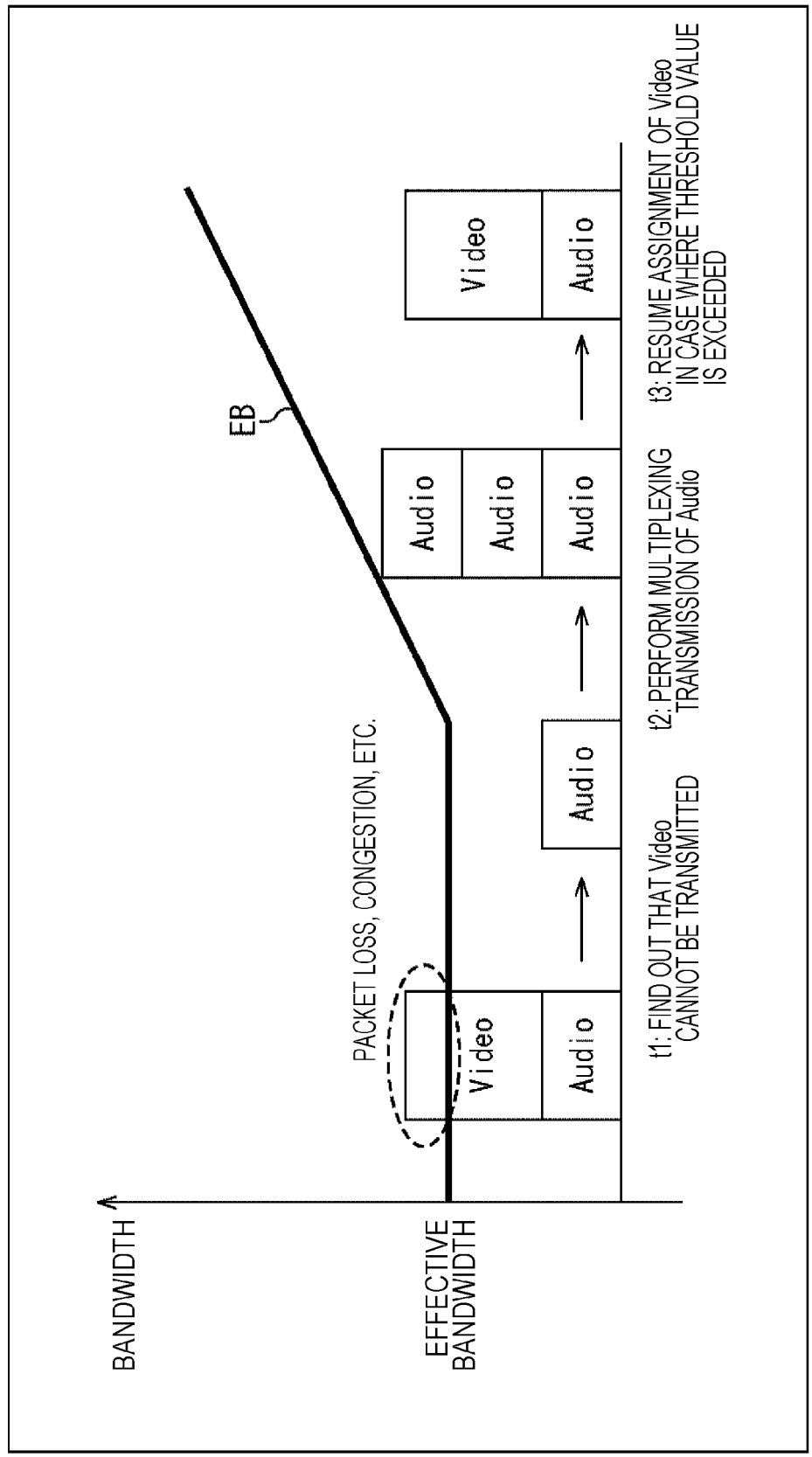
FIG. 5 is a diagram for explaining an outline of recovery determination for a link.

FIG. 5 is a diagram for explaining an outline of recovery determination for a link for which assignment of a frame has been stopped.

FIG. 5 illustrates an effective bandwidth EB and a temporal change in the amount of packets transmitted during a particular time period regarding a certain link.

As illustrated in FIG. 5, for example, at time t1, when the total amount of Audio and Video packets to be transmitted exceeds the effective bandwidth EB at that time, as marked by the broken line circle in FIG. 5, packet loss and network congestion are caused and the streaming cannot be normally performed; consequently, the QoS module 83 finds out that the Video packets (frame) cannot be transmitted.

Thereafter, the QoS module 83 stops assigning the Video packets to the certain link, and starts multiplexing transmission of the Audio packets at time t2. Here, multiplexing transmission of Audio packets is repeatedly performed such that the number of identical packets to be multiplexed and transmitted is raised every time transmission is performed. In this manner, the bandwidth of the certain link can be estimated.

Note that, in the example in FIG. 5, the effective bandwidth EB begins to rise from around time t2.

Then, at time t3, when the total amount of the Audio packets to be multiplexed and transmitted, in different terms, the bandwidth estimation result exceeds a preset threshold value, the QoS module 83 resumes assignment of the Video packets to the certain the link. At this time, the effective bandwidth EB is sufficiently larger than the total amount of the Audio and Video packets, and frames can be transmitted through the certain link.

(Link Recovery Determination Process)

Figure 6:
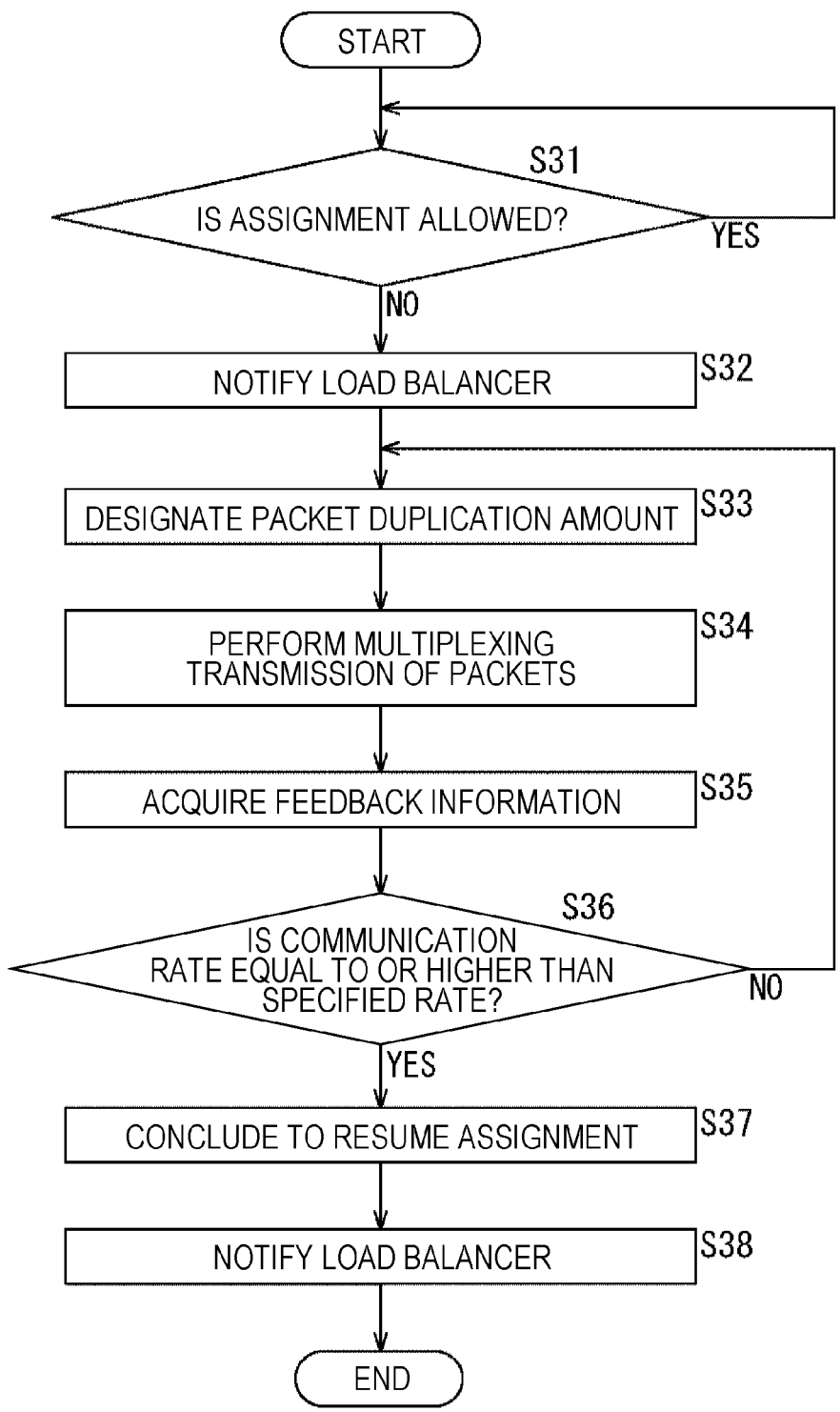
FIG. 6 is a flowchart for explaining a link recovery determination process.

FIG. 6 is a flowchart for explaining a link recovery determination process. The process in FIG. 6 is executed for each link by the QoS module 83.

In step S31, the QoS module 83 determines whether or not a frame (packets) can be assigned to a link as an object to be determined (hereinafter referred to as object link).

While it is determined that a frame can be assigned, the process in step S31 is repeated. Then, if it is determined that a frame cannot be assigned, the process proceeds to step S32, and the QoS module 83 notifies the load balancer 82 that a frame cannot be assigned to the object link.

With this notification, the load balancer 82 stops assigning a frame to the object link.

In step S33, the QoS module 83 designates a packet duplication amount used for bandwidth estimation.

In step S34, the QoS module 83 instructs the caster 84 to perform multiplexing transmission of the packets with the designated duplication amount. The caster 84 performs multiplexing transmission of the packets to the reception apparatus 12 according to the instruction from the QoS module 83. With respect to the packets from the transmission apparatus 11, the reception apparatus 12 transmits the feedback information about the object link to the transmission apparatus 11.

In step S35, the QoS module 83 acquires the feedback information about the object link from the reception apparatus 12 via the caster 84.

In step S36, the QoS module 83 determines whether or not the communication rate of the object link at that time point is equal to or higher than a preset specified rate, on the basis of the acquired feedback information. In other words, the bandwidth of the object link is estimated, and whether or not the estimated bandwidth exceeds a predetermined bandwidth is determined.

In a case where it is determined that the communication rate of the object link at that time point is not equal to or higher than the preset specified rate, the process returns to step S33, and the processes in steps S33 to S35 are repeated. At this time, each time the process is repeated, the packet duplication amount is increased.

Then, in a case where it is determined in step S36 that the communication rate of the object link at that time point is equal to or higher than the preset specified rate, the process proceeds to step S37, and the QoS module 83 concludes to resume assignment of a frame to the object link.

Thereafter, in step S38, the QoS module 83 notifies the load balancer 82 that it has been concluded that assignment of a frame to the object link is to be resumed.

With this notification, the load balancer 82 is caused to start assigning a frame to the object link again.

According to the above process, even in a case where the frame assignment to a certain link is stopped during bonding, the frame assignment to the certain link can be resumed at a proper timing while redundancy is ensured.

3. Retransmission of Data

In streaming by UDP, in a case where packet loss occurs due to an instantaneous interruption of the communication line or the like, the concerned data is lost. Therefore, the communication system 1 according to the present embodiment guarantees data by retransmitting the data.

(Data Retransmission Process)

Figure 7:
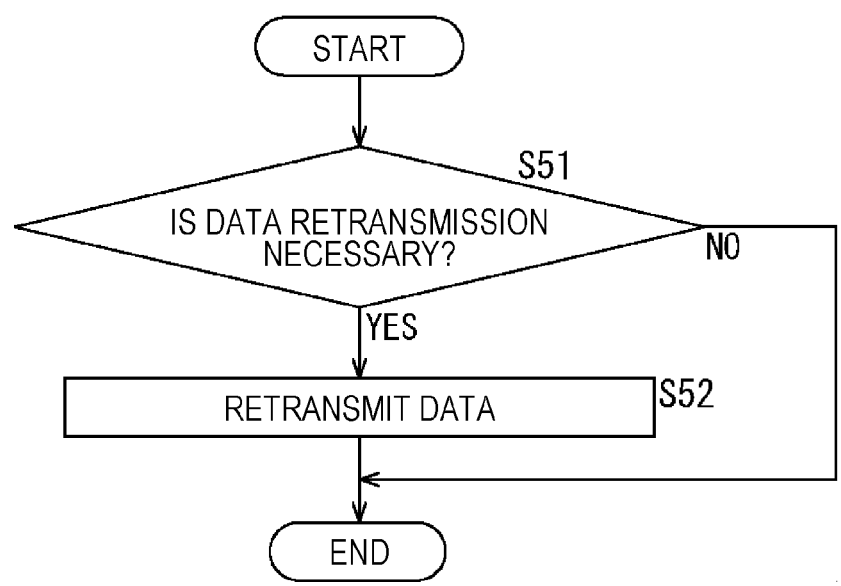
FIG. 7 is a flowchart for explaining a data retransmission process.

A data retransmission process in the communication system 1 will be described with reference to a flowchart in FIG. 7.

In step S51, the QoS module 83 determines whether or not data retransmission is necessary. An example of a case where data retransmission is necessary will be described later.

In a case where it is determined in step S51 that the data retransmission is necessary, the process proceeds to step S52, and the caster 84 retransmits the data determined that retransmission is necessary.

On the other hand, in a case where it is determined in step S51 that data retransmission is not necessary, the caster 84 does nothing and the process ends.

Here, an example of a case where data retransmission is necessary will be described with reference to FIGS. 8 and 9.

Figure 8:
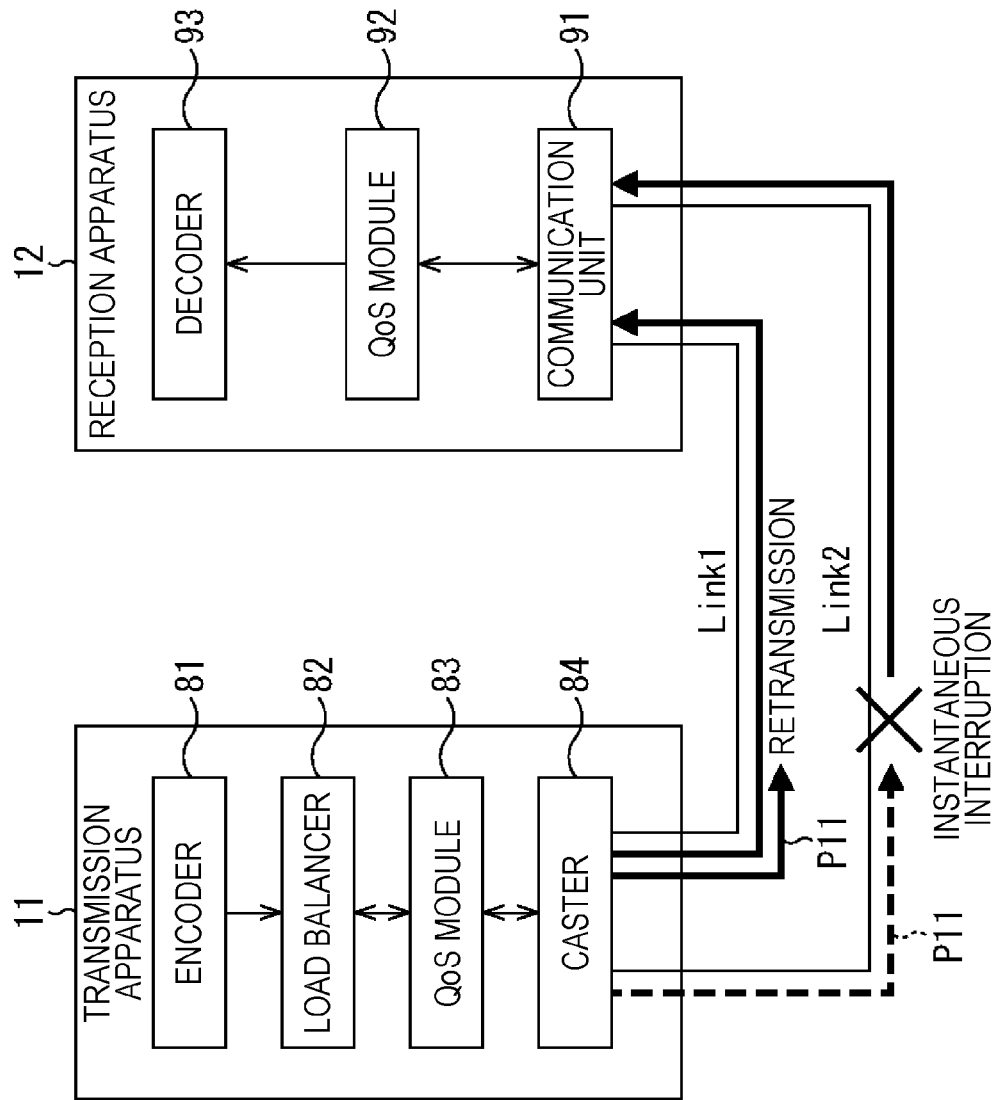
FIG. 8 is a diagram illustrating an example of data retransmission.

FIG. 8 illustrates an example of a case where an instantaneous interruption happens in the link 2 among the links 1 and 2.

In this case, on the basis of the feedback information about the link 2 from the reception apparatus 12 at the time of the instantaneous interruption, the QoS module 83 instructs the caster 84 to retransmit, using a different line (link 1), a packet P11 whose reception has not been confirmed in the reception apparatus 12, by switching the link. Consequently, the influence of packet loss can be reduced.

Figure 9:
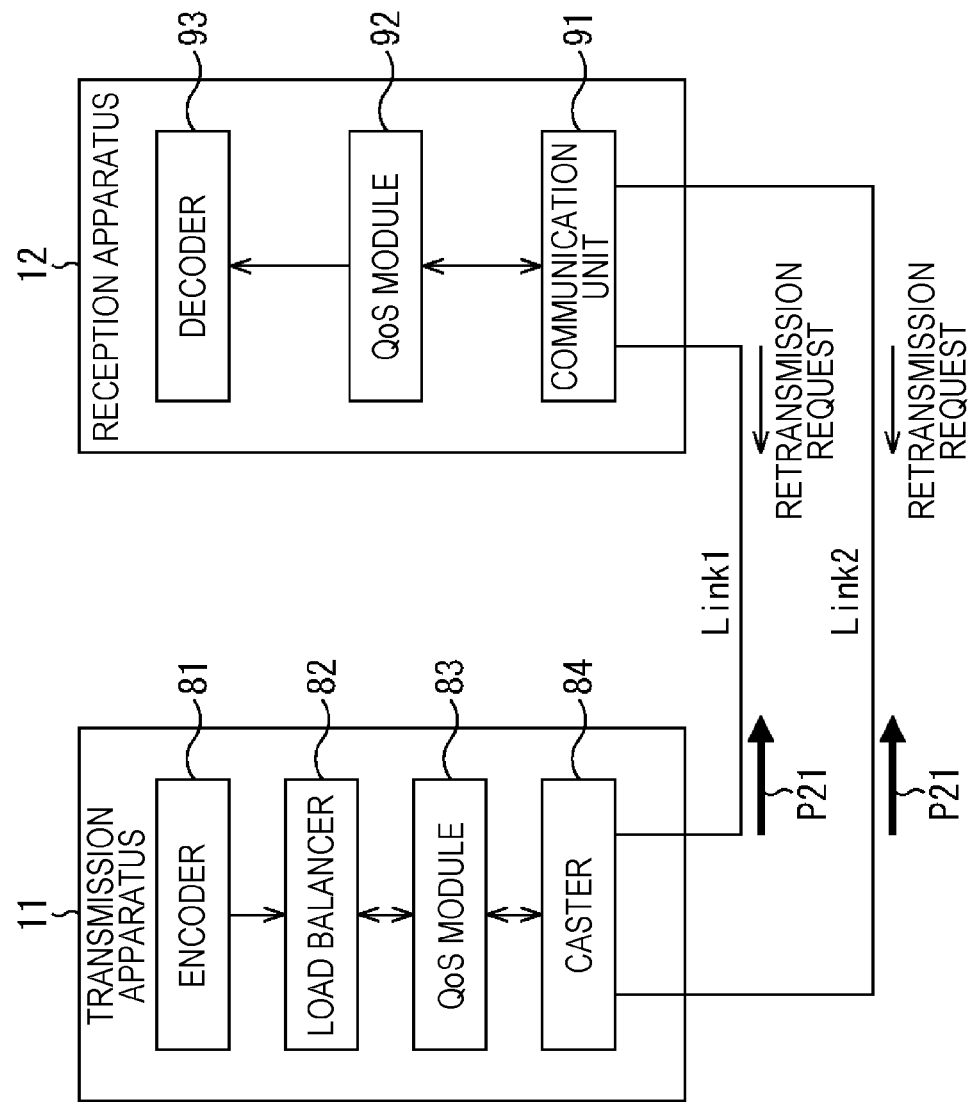
FIG. 9 is a diagram illustrating an example of data retransmission.

FIG. 9 illustrates an example of a case where a retransmission request is made from the reception apparatus 12 to the transmission apparatus 11.

In this case, on the basis of the retransmission request from the reception apparatus 12, the QoS module 83 instructs the caster 84 to retransmit a packet P21 requested to be retransmitted in parallel using both of the links 1 and 2. Consequently, the reliability of communication for which urgency is required can be improved.

4. Transmission of Stationary Packet in Buffer

In the communication system 1, the transmission apparatus 11 is configured to retain packets in a transmission buffer of the caster 84 and then transmit the retained packets to the reception apparatus 12.

(Transmission Process for Stationary Packet)

Figure 10:
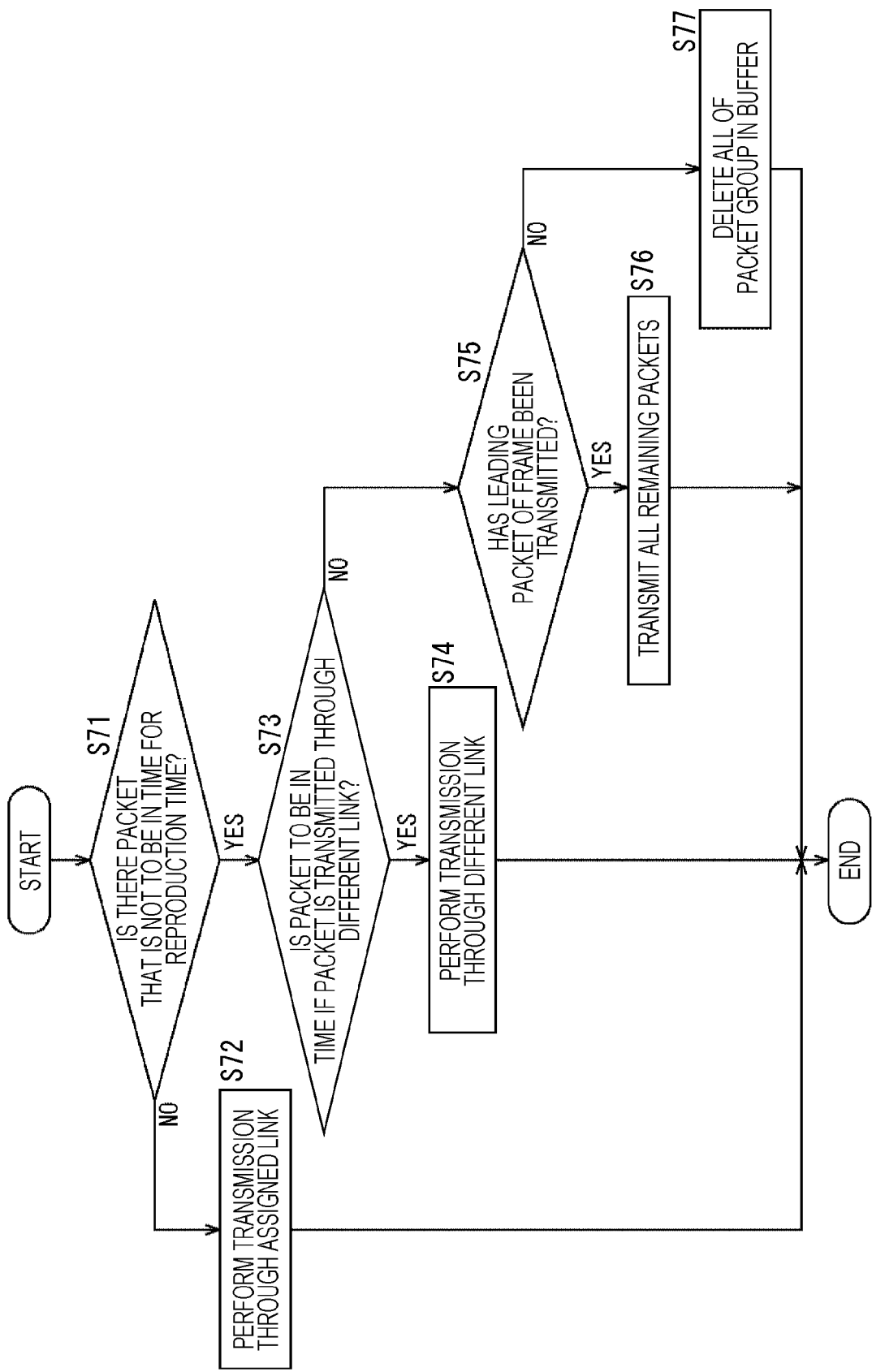
FIG. 10 is a flowchart for explaining a stationary packet transmission process.

Here, with reference to a flowchart in FIG. 10, a transmission process for a stationary packet in the transmission buffer of the caster 84 will be described.

In step S71, the QoS module 83 determines whether or not the transmission of the packet group in the transmission buffer of the caster 84 through the assigned link is to be completed by the use time of the packets in the reception apparatus 12, specifically, determines whether or not the packet group in the transmission buffer of the caster 84 contains a packet that is not to be in time for the reproduction time of the moving image in the reception apparatus 12. Note that the packet group to be determined is assumed to constitute one frame of moving image data.

In a case where it is determined in step S71 that there is no packet that is not to be in time for the reproduction time, the process proceeds to step S72, and the QoS module 83 instructs the caster 84 to transmit the packet group in the transmission buffer of the caster 84 through the link assigned by the load balancer 82.

On the other hand, in a case where it is determined in step S71 that there is a packet that is not to be in time for the reproduction time, the process proceeds to step S73.

In step S73, the QoS module 83 determines whether or not the packet determined not to be in time for the reproduction time is to be in time if the packet is transmitted through a different link other than the assigned link.

In a case where it is determined in step S73 that the packet is to be in time if the packet is transmitted through the different link, the process proceeds to step S74, and the QoS module 83 instructs the caster 84 to transmit the packet group in the transmission buffer of the caster 84 through the different link.

On the other hand, in a case where it is determined in step S73 that the packet is not to be in time even if the packet is transmitted through a different link, the process proceeds to step S75.

In step S75, the QoS module 83 determines whether or not the leading packet of the packet group in the transmission buffer, in other words, the packet group constituting one frame has been transmitted.

In a case where it is determined in step S75 that the leading packet of one frame has been transmitted, the process proceeds to step S76, and the QoS module 83 instructs the caster 84 to transmit all the remaining packets in the packet group in the transmission buffer through the link assigned by the load balancer 82.

Figure 11:
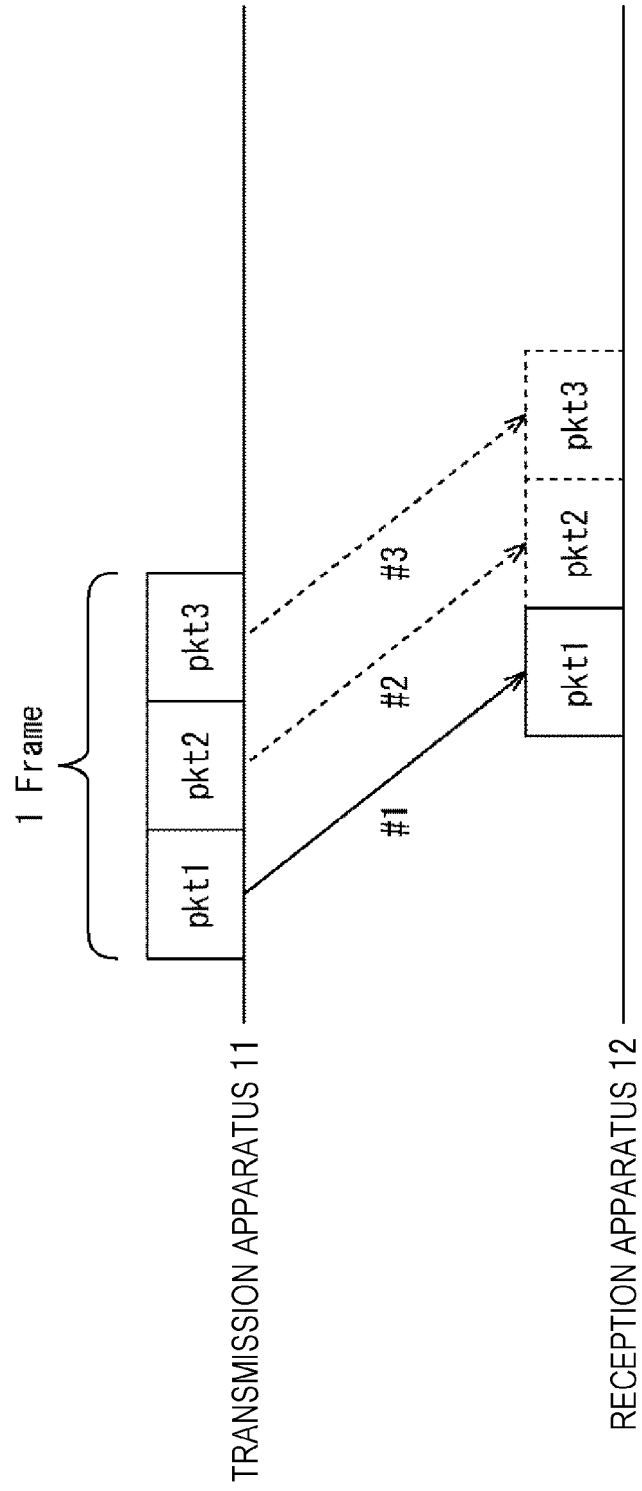
FIG. 11 is a diagram for explaining packet transmission after transmission of a leading packet.

For example, as illustrated in FIG. 11, it is assumed that three packets pkt1, pkt2, and pkt3 constitute one frame. In a case where the leading packet pkt1 among these three packets has already been transmitted from the transmission apparatus 11 to the reception apparatus 12 as indicated by the arrow #1 in FIG. 11, the remaining packets pkt2 and pkt3 are transmitted from the transmission apparatus 11 to the reception apparatus 12 at once, as indicated by the arrows #2 and #3 in FIG. 11.

In this case, as a result, there is a possibility that the transmitted packets are not in time for the reproduction time in the reception apparatus 12 or packet loss occurs; however, there is also a possibility that the remaining packets can be transmitted correctly, for example, in a case where the status of the assigned link becomes better.

Note that, in this example, it is assumed that all the remaining packets are transmitted at once in a case where the leading packet of one frame has been transmitted; however, all the remaining packets may be transmitted at once in a case where a predetermined number of packets from the leading packet have been transmitted.

Furthermore, when all the remaining packets of the packet group in the transmission buffer are transmitted, the remaining packets of the packet group in the transmission buffer may be allocated to the link assigned by the load balancer 82 and another link on the basis of the status of other links. For example, the packets are allocated such that the first half of packets of the packet group in the transmission buffer is transmitted through another link, and the remaining packets are transmitted through the assigned link. Consequently, the possibility of the occurrence of transmission delay and packet loss can be reduced as compared with transmission through only the assigned link.

Subsequently, returning to the flowchart in FIG. 10, in a case where it is determined in step S75 that the leading packet of one frame has not been transmitted, the process proceeds to step S77, and the QoS module 83 instructs the caster 84 to delete all the packets in the packet group in the transmission buffer.

According to the above process, it becomes possible to transmit a packet in time for the reproduction time of the moving image in the reception apparatus 12 according to the status of links.

5. Variations

Figure 12:
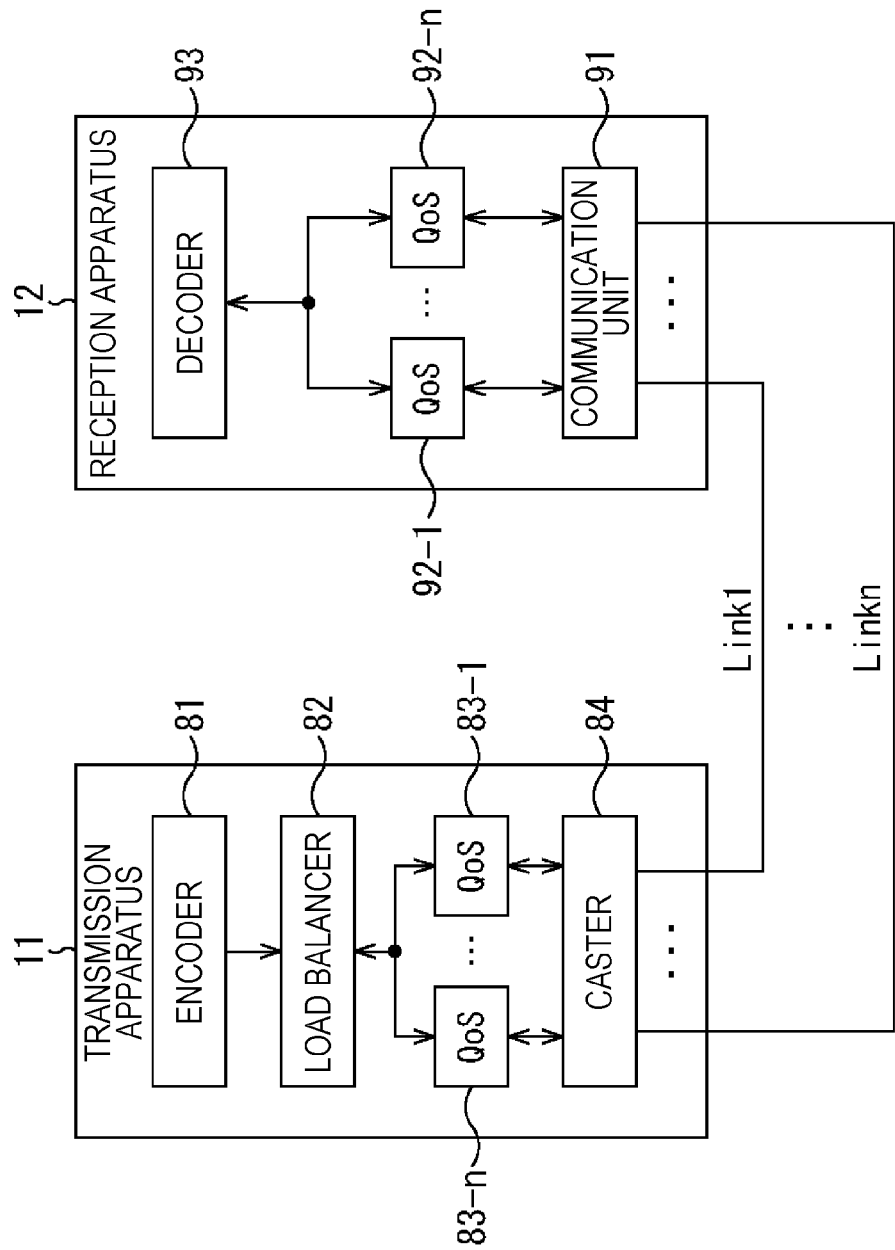
FIG. 12 is a block diagram illustrating another functional configuration example of the transmission apparatus and the reception apparatus.

In the configuration described above, the transmission apparatus 11 is assumed to perform streaming using two communication lines (links); however, the number of links is not limited to two, and an arbitrary number n may be adopted as illustrated in FIG. 12.

In this case, the transmission apparatus 11 and the reception apparatus 12 may be provided with QoS modules 83-1 to 83-$n$ and QoS modules 92-1 to 92-$n$, respectively, for individual links 1 to n.

6. Application Examples

An example in which the technology according to the present disclosure is applied to the communication system that performs television broadcasting has been described above; however, the technology is not limited to this example and can be applied to a variety of systems. For example, the technology according to the present disclosure may be applied to a surgery room system.

Figure 13:
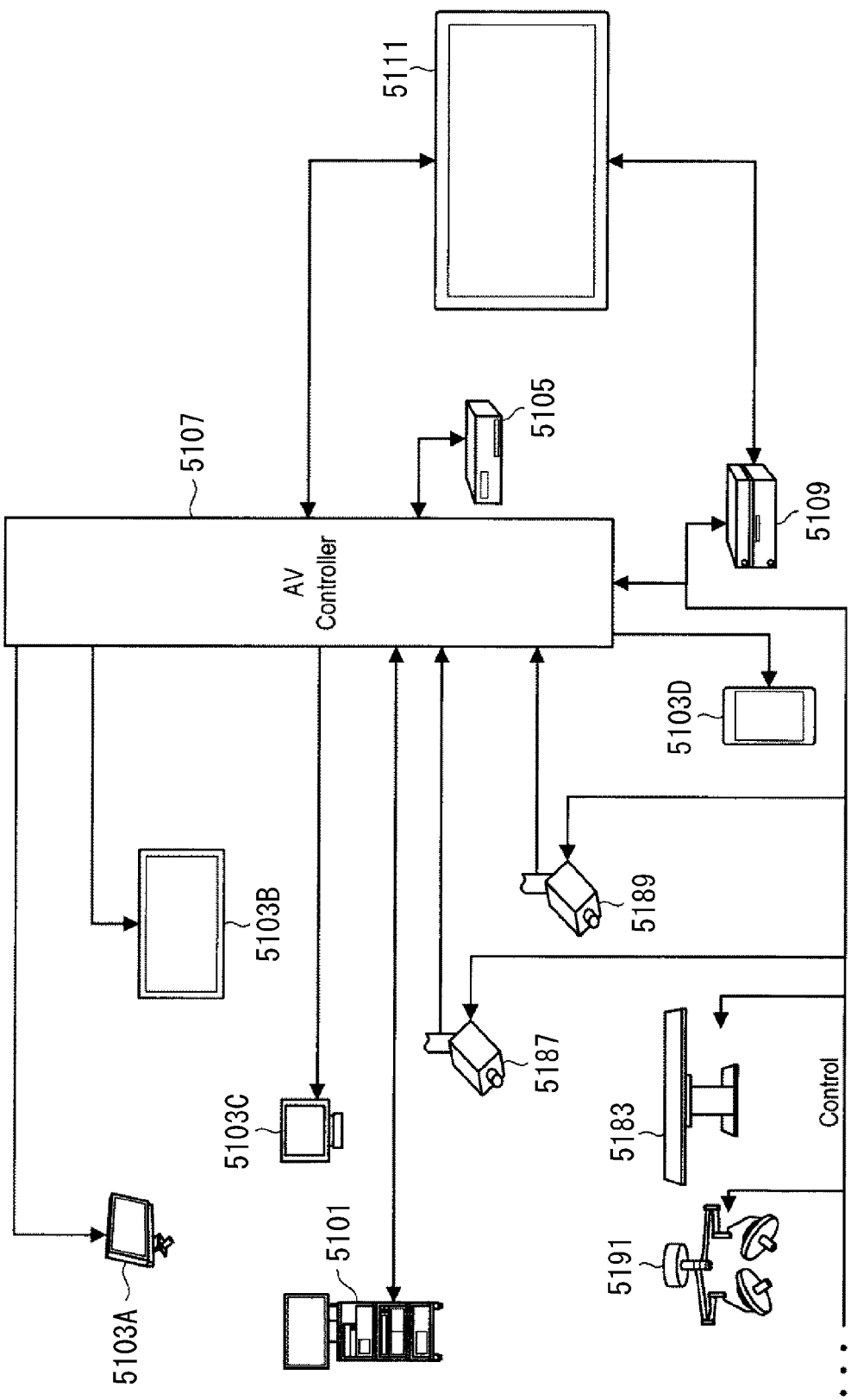
FIG. 13 is a diagram schematically illustrating the overall configuration of a surgery room system.

FIG. 13 is a diagram schematically illustrating the overall configuration of the surgery room system 5100 to which the technology according to the present disclosure can be applied. Referring to FIG. 13, the surgery room system 5100 is configured such that a group of apparatuses installed in a surgery room are connected to each other so as to be able to cooperate via an audio-visual controller (AV controller) 5107 and a surgery room control apparatus 5109.

A variety of apparatuses can be installed in the surgery room. FIG. 13 illustrates, as an example, an apparatus group 5101 of various types for a surgery through an endoscope, a ceiling camera 5187 provided on the ceiling of the surgery room to image the area around the hands of an operating surgeon, a surgical field camera 5189 provided on the ceiling of the surgery room to image events in the entire surgery room, a plurality of display apparatuses 5103A to 5103D, a recorder 5105, a patient bed 5183, and an illumination 5191.

Here, among these apparatuses, the apparatus group 5101 belongs to an endoscopic surgery system 5113 to be described later and includes an endoscope and a display apparatus or the like that displays an image captured by the endoscope. Each apparatus belonging to the endoscopic surgery system 5113 is also called as a medical instrument. Meanwhile, the display apparatuses 5103A to 5103D, the recorder 5105, the patient bed 5183, and the illumination 5191 are apparatuses situated, for example, in the surgery room apart from the endoscopic surgery system 5113. Each of these apparatuses not belonging to the endoscopic surgery system 5113 is also called as a non-medical instrument. The audio-visual controller 5107 and/or the surgery room control apparatus 5109 control working of these medical instruments and non-medical instruments cooperatively with each other.

The audio-visual controller 5107 comprehensively controls processes relating to image display in the medical instruments and non-medical instruments. Specifically, among the apparatuses included in the surgery room system 5100, the apparatus group 5101, the ceiling camera 5187, and the surgical field camera 5189 can be apparatuses (hereinafter also called as distribution source apparatuses) having a function of distributing information (hereinafter also referred to as display information) to be displayed during surgery. Furthermore, the display apparatuses 5103A to 5103D can be apparatuses (hereinafter also called as output destination apparatuses) to which the display information is output. In addition, the recorder 5105 can be an apparatus fulfilling both of the distribution source apparatus and the output destination apparatus. The audio-visual controller 5107 controls working of the distribution source apparatuses and the output destination apparatuses and has a function of acquiring the display information from the distribution source apparatuses and transmitting the acquired display information to the output destination apparatuses to display or record the acquired display information on the output destination apparatuses. Note that the display information includes various images captured during surgery, various types of information regarding surgery (for example, body information of a patient, information about past examination results and surgical procedures, and the like), and the like.

Specifically, information about the image of the surgical site in the body cavity of the patient captured by an endoscope can be transmitted to the audio-visual controller 5107 from the apparatus group 5101 as the display information. Furthermore, information about the image of the area around the hands of the operating surgeon captured by the ceiling camera 5187 can be transmitted from this ceiling camera 5187 as the display information. In addition, information about the image indicating events in the entire surgery room captured by the surgical field camera 5189 can be transmitted from this surgical field camera 5189 as the display information. Note that, in a case where the surgery room system 5100 contains another apparatus having the imaging function, the audio-visual controller 5107 may acquire information about the image captured by the another apparatus also from the another apparatus as the display information.

Alternatively, for example, information about these images captured in the past is recorded in the recorder 5105 by the audio-visual controller 5107. The audio-visual controller 5107 can acquire information about these images captured in the past from the recorder 5105 as the display information. Note that also various types of information regarding surgery may be recorded in the recorder 5105 beforehand.

The audio-visual controller 5107 displays the acquired display information (in other words, images captured during surgery or various types of information regarding surgery) on at least one of the display apparatuses 5103A to 5103D, which are the output destination apparatuses. In the illustrated example, the display apparatus 5103A is a display apparatus installed by being suspended from the ceiling of the surgery room, the display apparatus 5103B is a display apparatus installed on the wall surface of the surgery room, the display apparatus 5103C is a display apparatus installed on a desk in the surgery room, and the display apparatus 5103D is a mobile instrument having a display function (for example, a tablet personal computer (PC)).

Furthermore, although illustration is omitted in FIG. 13, the surgery room system 5100 may include an apparatus outside the surgery room. Apparatuses outside the surgery room can be, for example, servers connected to a network constructed inside and outside the hospital, PCs used by medical staff, projectors installed in conference rooms of the hospital, and the like. In a case where such external apparatuses are located outside the hospital, the audio-visual controller 5107 can also display the display information on a display apparatus of another hospital via a television conference system or the like for remote medical treatment.

The surgery room control apparatus 5109 comprehensively controls processes other than processes relating to image display in the non-medical instruments. For example, the surgery room control apparatus 5109 controls driving of the patient bed 5183, the ceiling camera 5187, the surgical field camera 5189, and the illumination 5191.

A centralized operation panel 5111 is provided in the surgery room system 5100, and a user can give an instruction about image display to the audio-visual controller 5107 or can give an instruction about working of the non-medical instruments to the surgery room control apparatus 5109 via this centralized operation panel 5111. The centralized operation panel 5111 is configured in such a manner that a touch panel is provided on a display surface of the display apparatus.

Figure 14:
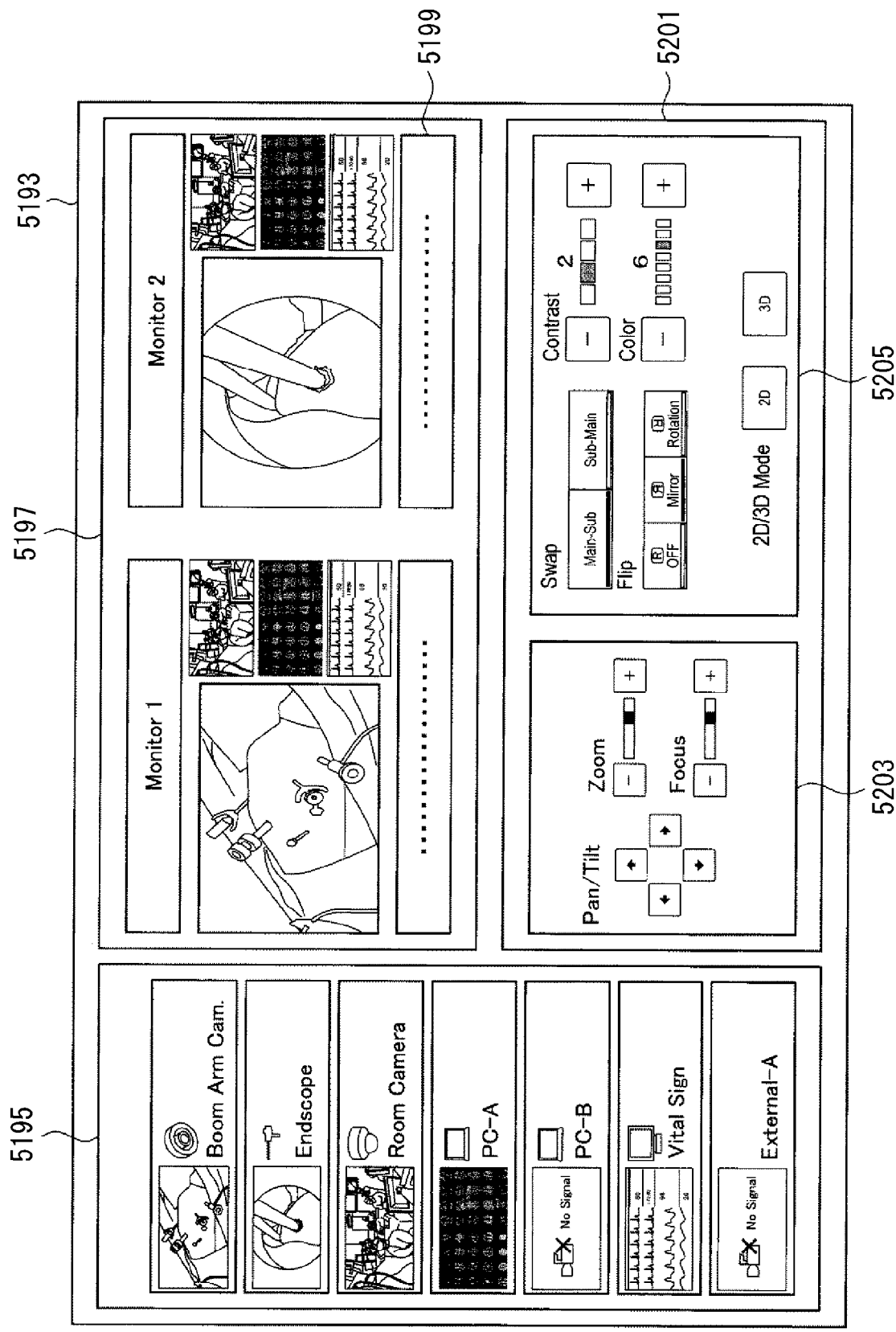
FIG. 14 is a diagram illustrating a display example of an operation screen on a centralized operation panel.

FIG. 14 is a diagram illustrating a display example of an operation screen on the centralized operation panel 5111. As an example, FIG. 14 illustrates an operation screen corresponding to a case where two display apparatuses are provided as the output destination apparatuses in the surgery room system 5100. Referring to FIG. 14, the operation screen 5193 is provided with a distribution source selection area 5195, a preview area 5197, and a control area 5201.

In the distribution source selection area 5195, distribution source apparatuses included in the surgery room system 5100 and thumbnail screens representing the display information kept by these distribution source apparatuses are linked and displayed. The user can select display information to be displayed on the display apparatus from any one of the distribution source apparatuses displayed in the distribution source selection area 5195.

In the preview area 5197, previews of screens displayed on the two display apparatuses (Monitor 1 and Monitor 2), which are the output destination apparatuses, are displayed. In the illustrated example, four images are displayed as a picture-in-picture (P-in-P) display on one display apparatus. These four images correspond to the display information distributed from the distribution source apparatus selected in the distribution source selection area 5195. Among the four images, one is displayed relatively large as a main image and the remaining three images are displayed relatively small as sub images. The user can interchange the main image with the sub images by appropriately selecting areas in which the four images are displayed. Furthermore, a status display area 5199 is provided under the areas in which the four images are displayed, and the status relating to the surgery (for example, the elapsed time of the surgery, the body information of the patient, and the like) can be appropriately displayed in this area.

The control area 5201 is provided with a distribution source operation area 5203 in which a graphical user interface (GUI) component for performing operations on the distribution source apparatus is displayed, and an output destination operation area 5205 in which a GUI component for performing operations on the output destination apparatus is displayed. In the illustrated example, GUI components for performing various operations (panning, tilting, and zooming) on a camera of the distribution source apparatus having the imaging function are provided in the distribution source operation area 5203. By appropriately selecting these GUI components, the user can operate working of the camera of the distribution source apparatus. Note that, although illustration is omitted, in a case where the distribution source apparatus being selected in the distribution source selection area 5195 is a recorder (in other words, in a case where an image recorded in the recorder in the past is displayed in the preview area 5197), GUI components for performing operations such as reproduction, reproduction stop, rewind, and fast forward of this past recorded image can be provided in the distribution source operation area 5203.

Furthermore, the output destination operation area 5205 is provided with GUI components for performing various operations (swap, flip, color adjustment, contrast adjustment, switching between two-dimensional (2D) display and three-dimensional (3D) display) with respect to display on the display apparatus, which is the output destination apparatus. By appropriately selecting these GUI components, the user can operate display on the display apparatus.

Note that the operation screen displayed on the centralized operation panel 5111 is not limited to the example illustrated in FIG. 14 and the user can be allowed to input, via the centralized operation panel 5111, operations to each apparatus that is included in the surgery room system 5100 and can be controlled by the audio-visual controller 5107 and the surgery room control apparatus 5109.

Figure 15:
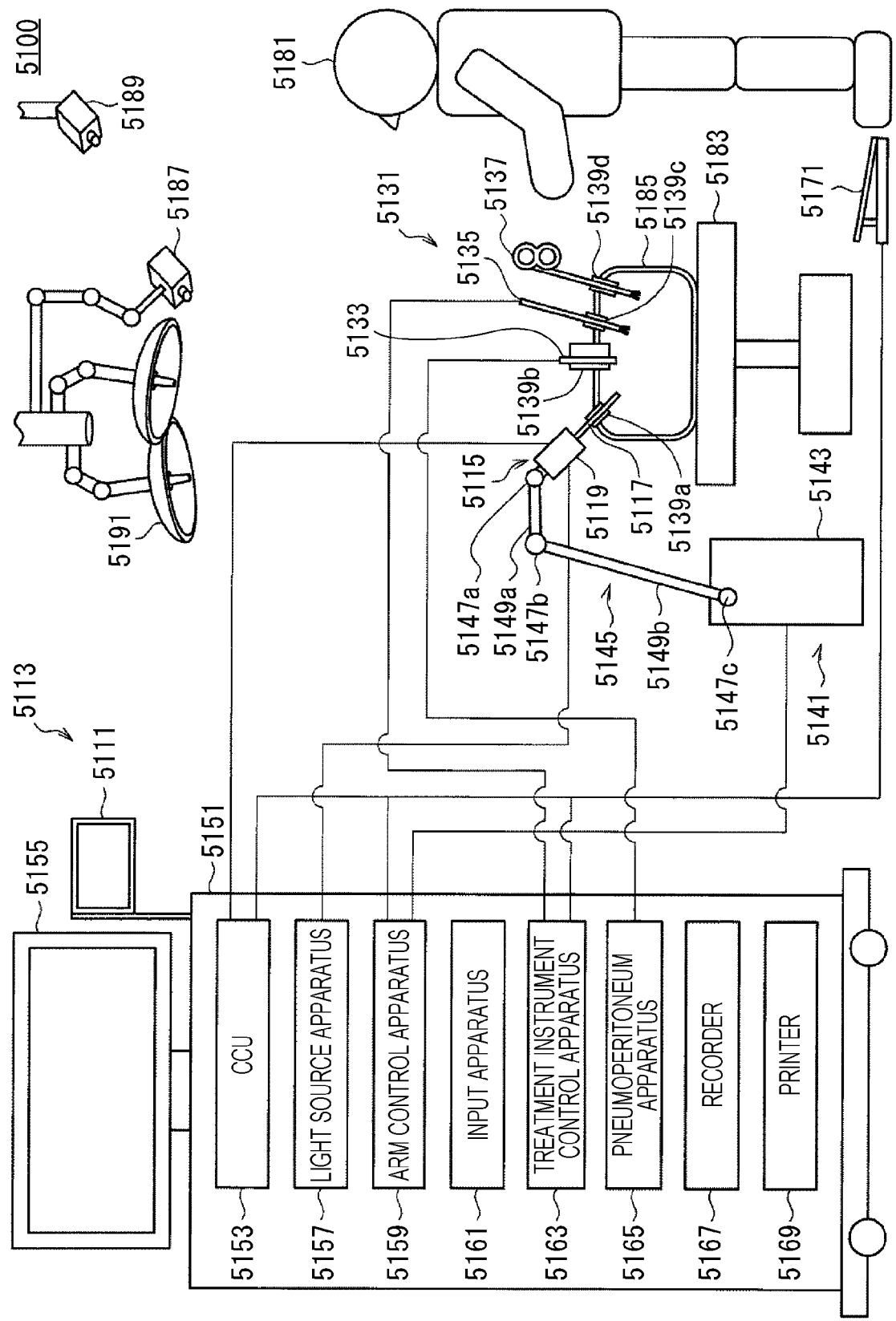
FIG. 15 is a diagram illustrating an example of how a surgery is conducted while the surgery room system is applied.

FIG. 15 is a diagram illustrating an example of how a surgery is conducted while the surgery room system described above is applied. The ceiling camera 5187 and the surgical field camera 5189 are provided on the ceiling of the surgery room and can capture the area around the hands of an operating surgeon (surgeon) 5181 performing the treatment on an affected part of a patient 5185 on the patient bed 5183, and events in the entire surgery room. The ceiling camera 5187 and the surgical field camera 5189 can be provided with a magnification adjustment function, a focal length adjustment function, a capturing direction adjustment function, and the like. The illumination 5191 is provided on the ceiling of the surgery room and irradiates at least the area around the hands of the operating surgeon 5181. The illumination 5191 can be capable of appropriately adjusting its irradiation light amount, wavelength (color) of the irradiation light, light irradiation direction, and the like.

As illustrated in FIG. 13, the endoscopic surgery system 5113, the patient bed 5183, the ceiling camera 5187, the surgical field camera 5189, and the illumination 5191 are connected to each other so as to be able to cooperate via the audio-visual controller 5107 and the surgery room control apparatus 5109 (not illustrated in FIG. 15). The centralized operation panel 5111 is provided in the surgery room and, as described above, the user can appropriately operate these apparatuses located in the surgery room via this centralized operation panel 5111.

Hereinafter, the configuration of the endoscopic surgery system 5113 will be described in detail. As illustrated in FIG. 15, the endoscopic surgery system 5113 is constituted by an endoscope 5115, other surgical tools 5131, a support arm apparatus 5141 supporting the endoscope 5115, and a cart 5151 in which various apparatuses for surgery through the endoscope are placed.

In endoscopic surgery, instead of cutting the abdominal wall and opening the abdomen, a plurality of cylindrical puncture tools called trocars 5139*a* to 5139*d* is punctured into the abdominal wall. Then, a lens barrel 5117 of the endoscope 5115 and other surgical tools 5131 are inserted into the body cavity of the patient 5185 through the trocars 5139*a* to 5139*d*. In the illustrated example, a pneumoperitoneum tube 5133, an energy treatment instrument 5135, and a forceps 5137 are inserted into the body cavity of the patient 5185 as the other surgical tools 5131. Furthermore, the energy treatment instrument 5135 is a treatment instrument that performs incision and detachment of tissue, sealing of a blood vessel, and the like by high-frequency current or ultrasonic vibration. However, the illustrated surgical tools 5131 are merely an example and various surgical tools generally used for surgery through the endoscope, such as a thumb forceps and a retractor, can be used as the surgical tools 5131.

The image of the surgical site in the body cavity of the patient 5185 captured by the endoscope 5115 is displayed on a display apparatus 5155. The operating surgeon 5181 performs treatment such as cutting off the affected part using the energy treatment instrument 5135 and the forceps 5137 while viewing the image of the surgical site displayed on the display apparatus 5155 in real time. Note that, although illustration is omitted, the pneumoperitoneum tube 5133, the energy treatment instrument 5135, and the forceps 5137 are supported by the operating surgeon 5181 or an assistant or the like during surgery.

(Support Arm Apparatus)

The support arm apparatus 5141 includes an arm portion 5145 extending from a base portion 5143. In the illustrated example, the arm portion 5145 is constituted by joint portions 5147*a*, 5147*b*, and 5147*c*, and links 5149*a* and 5149*b* and is driven under the control of an arm control apparatus 5159. The endoscope 5115 is supported by the arm portion 5145 such that the position and posture of the endoscope 5115 are controlled. With this configuration, fixing of the position of the endoscope 5115 can be implemented in a stable manner.

(Endoscope)

The endoscope 5115 is constituted by the lens barrel 5117 of which an area of a predetermined length from the distal end is inserted into the body cavity of the patient 5185, and a camera head 5119 connected to the proximal end of the lens barrel 5117. In the illustrated example, the endoscope 5115 configured as a so-called rigid endoscope having the rigid lens barrel 5117 is illustrated; however, the endoscope 5115 may be configured as a so-called flexible endoscope having the flexible lens barrel 5117.

An opening portion into which an objective lens is fitted is provided at the distal end of the lens barrel 5117. A light source apparatus 5157 is connected to the endoscope 5115; light generated by this light source apparatus 5157 is guided to the distal end of the lens barrel 5117 by a light guide provided extending inside this lens barrel, and is radiated toward an object to be observed in the body cavity of the patient 5185 via the objective lens. Note that the endoscope 5115 may be a forward-viewing endoscope, an oblique-viewing endoscope, or a side-viewing endoscope.

An optical system and an imaging element are provided inside the camera head 5119 and reflected light (observation light) from the object to be observed is converged on this imaging element by this optical system. The observation light is photoelectrically converted by the imaging element and an electrical signal corresponding to the observation light, in other words, an image signal corresponding to the observation image is generated. This image signal is transmitted as RAW data to a camera control unit (CCU) 5153. Note that the camera head 5119 is equipped with a function of adjusting the magnification and focal length by appropriately driving the optical system thereof.

In addition, for example, in order to cope with stereoscopic viewing (3D display) or the like, a plurality of imaging elements may be provided in the camera head 5119. In this case, a plurality of relay optical systems is provided inside the lens barrel 5117 in order to guide the observation light to each of the plurality of imaging elements.

(Various Apparatuses Placed in Cart)

The CCU 5153 is constituted by a central processing unit (CPU), graphics processing unit (GPU), or the like and comprehensively controls working of the endoscope 5115 and the display apparatus 5155. Specifically, the CCU 5153 carries out various image processes for displaying an image based on the image signal accepted from the camera head 5119, such as a developing process (demosaic process), on this image. The CCU 5153 provides the image signal on which these image processes have been carried out to the display apparatus 5155. Furthermore, the audio-visual controller 5107 illustrated in FIG. 13 is connected to the CCU 5153. The CCU 5153 also provides the image signal on which the image processes have been carried out to the audio-visual controller 5107. In addition, the CCU 5153 transmits a control signal to the camera head 5119 and controls driving of the camera head 5119. This control signal can include information regarding imaging conditions such as magnification and focal length. This information regarding the imaging conditions may be input via an input apparatus 5161 or may be input via the above-described centralized operation panel 5111.

The display apparatus 5155 displays an image based on the image signal on which the image processes have been carried out by the CCU 5153, under the control of the CCU 5153. In a case where the endoscope 5115 is compatible with high resolution capturing such as 4K capturing (the number of horizontal pixels 3840×the number of vertical pixels 2160), or 8K capturing (the number of horizontal pixels 7680×the number of vertical pixels 4320), and/or is compatible with 3D display, a display apparatus capable of high resolution display and/or capable of 3D display can be used as the display apparatus 5155 so as to cope with each case. In a case where the endoscope 5115 is compatible with high resolution capturing such as 4K or 8K capturing, a more immersive feeling can be obtained by using a display apparatus 5155 having a size of 55 inches or more. Furthermore, a plurality of display apparatuses 5155 with different resolutions and sizes may be provided depending on the practical usage.

The light source apparatus 5157 is constituted, for example, by a light source such as a light emitting diode (LED) and supplies irradiation light used when the surgical site is captured to the endoscope 5115.

The arm control apparatus 5159 is constituted, for example, by a processor such as a CPU and works in accordance with a predetermined program to control driving of the arm portion 5145 of the support arm apparatus 5141 in accordance with a predetermined control scheme.

The input apparatus 5161 is an input interface to the endoscopic surgery system 5113. The user can input various types of information and input instructions to the endoscopic surgery system 5113 via the input apparatus 5161. For example, the user inputs various types of information regarding surgery, such as body information of the patient and information about the surgical procedure of the surgery, via the input apparatus 5161. Furthermore, for example, the user inputs an instruction to drive the arm portion 5145, an instruction to change the imaging conditions (the type of irradiation light, the magnification, the focal length, and the like) for the endoscope 5115, an instruction to drive the energy treatment instrument 5135, and the like via the input apparatus 5161.

The type of the input apparatus 5161 is not limited and the input apparatus 5161 can be various known input apparatuses. For example, a mouse, a keyboard, a touch panel, a switch, a foot switch 5171, a lever, and/or the like, can be applied as the input apparatus 5161. In a case where a touch panel is used as the input apparatus 5161, the touch panel may be provided on the display surface of the display apparatus 5155.

Alternatively, the input apparatus 5161 is a device worn by the user, such as a glasses-type wearable device or a head mounted display (HMD), and various inputs are made according to the gesture and the line of sight of the user detected by these devices. Furthermore, the input apparatus 5161 includes a camera capable of detecting the motion of the user and various inputs are made according to the gesture and the line of sight of the user detected from a video captured by the camera. Moreover, the input apparatus 5161 includes a microphone capable of picking up the voice of the user and various inputs are made by sound via the microphone. In this manner, by configuring the input apparatus 5161 so as to be able to input various types of information in a non-contact manner, particularly a user (for example, the operating surgeon 5181) belonging to a clean area is allowed to operate an instrument belonging to a non-clean area in a non-contact manner. In addition, since the user can operate the instrument without releasing his/her hand from the holding surgical tool, the user's convenience is improved.

A treatment instrument control apparatus 5163 controls driving of the energy treatment instrument 5135 for cauterization and incision of tissue, or sealing of a blood vessel, or the like. For the purpose of securing a visual field of the endoscope 5115 and securing a working space for the operating surgeon, a pneumoperitoneum apparatus 5165 delivers a gas into the body cavity of the patient 5185 via the pneumoperitoneum tube 5133 in order to inflate the body cavity. A recorder 5167 is an apparatus capable of recording various types of information regarding surgery. A printer 5169 is an apparatus capable of printing various types of information regarding surgery in various formats such as text, image, or graph.

Hereinafter, a particularly characteristic configuration of the endoscopic surgery system 5113 will be described in more detail.

(Support Arm Apparatus)

The support arm apparatus 5141 includes the base portion 5143 as a pedestal and the arm portion 5145 extending from the base portion 5143. In the illustrated example, the arm portion 5145 is constituted by the plurality of joint portions 5147*a*, 5147*b*, and 5147*c*, and the plurality of links 5149*a* and 5149*b* coupled by the joint portion 5147*b*; in FIG. 15, however, for the sake of simplicity, the configuration of the arm portion 5145 is illustrated in a simplified manner. Actually, the shapes, the number, and the arrangement of the joint portions 5147*a* to 5147*c* and the links 5149*a* and 5149*b*, as well as the directions of the rotation axes of the joint portions 5147*a* to 5147*c*, and the like can be appropriately set such that the arm portion 5145 has a desired degree of freedom. For example, the arm portion 5145 can be suitably configured so as to have degrees of freedom equal to or greater than six degrees of freedom. This allows the endoscope 5115 to freely move within the movable range of the arm portion 5145, such that the lens barrel 5117 of the endoscope 5115 can be inserted into the body cavity of the patient 5185 in a desired direction.

Actuators are provided in the joint portions 5147*a* to 5147*c* and the joint portions 5147*a* to 5147*c* are configured so as to be rotatable around predetermined rotation axes by driving of these actuators. Driving of the actuators is controlled by the arm control apparatus 5159, such that the rotation angle of each of the joint portions 5147*a* to 5147*c* is controlled and then driving of the arm portion 5145 is controlled. With this configuration, the control of the position and posture of the endoscope 5115 can be implemented. At this time, the arm control apparatus 5159 can control driving of the arm portion 5145 by various known control schemes such as force control or position control.

For example, the position and posture of the endoscope 5115 can be controlled in such a manner that the operating surgeon 5181 appropriately makes an operation input via the input apparatus 5161 (including the foot switch 5171) and in turn the arm control apparatus 5159 appropriately controls driving of the arm portion 5145 according to the operation input. With this control, the endoscope 5115 at the distal end of the arm portion 5145 can be moved from an arbitrary position to another arbitrary position and thereafter can be fixedly supported at that position after the movement. Note that the arm portion 5145 may be operated by a so-called master slave scheme. In this case, the arm portion 5145 can be remotely operated by the user via the input apparatus 5161 installed at a place away from the surgery room.

Furthermore, in a case where the force control is applied, the arm control apparatus 5159 may perform so-called power assist control in which the actuators of the respective joint portions 5147a to 5147c are driven in response to an external force from the user such that the arm portion 5145 moves smoothly in proportion to the external force. With this control, when the user moves the arm portion 5145 while directly touching the arm portion 5145, the arm portion 5145 can be moved with a relatively light force. Accordingly, it becomes possible to more intuitively move the endoscope 5115 with a simpler operation and user's convenience can be improved.

Here, in general surgery through the endoscope, the endoscope 5115 has been supported by a surgeon called a scopist. In contrast to this, using the support arm apparatus 5141 makes it possible to reliably fix the position of the endoscope 5115 without manual operation, such that the image of the surgical site can be stably obtained and surgery can be performed smoothly.

Note that the arm control apparatus 5159 is not necessarily provided in the cart 5151. Furthermore, the arm control apparatus 5159 is not necessarily one apparatus. For example, the arm control apparatus 5159 may be provided in each of the joint portions 5147a to 5147c of the arm portion 5145 of the support arm apparatus 5141 such that control of driving of the arm portion 5145 is implemented by the plurality of arm control apparatuses 5159 collaborating with each other.

(Light Source Apparatus)

The light source apparatus 5157 supplies the endoscope 5115 with irradiation light when the surgical site is captured. The light source apparatus 5157 is constituted by, for example, an LED, a laser light source, or a white light source constituted by a combination thereof. At this time, in a case where the white light source is configured by a combination of RGB laser light sources, the output intensity and the output timing of each color (each wavelength) can be controlled with high precision and accordingly the white balance of the captured image can be adjusted in the light source apparatus 5157. Furthermore, in this case, by irradiating an object to be observed with a laser beam from each of the RGB laser light sources by time sharing and controlling driving of the imaging element of the camera head 5119 in synchronization with the irradiation timing, it is also possible to capture an image correspond to each of RGB by time sharing. According to this method, a color image can be obtained without providing a color filter in the imaging element.

In addition, driving of the light source apparatus 5157 may be controlled such that the intensity of light to be output is changed for every predetermined time span. By controlling driving of the imaging element of the camera head 5119 in synchronism with the timing of the change of the intensity of light to acquire images by time sharing and merging these images, an image of a high dynamic range without so-called blocked up shadows and blown out highlights can be generated.

Furthermore, the light source apparatus 5157 may be configured such that light of a predetermined wavelength band compatible with special light observation can be supplied from the light source apparatus 5157. In the special light observation, for example, by utilizing the wavelength dependence of light absorption in body tissue, so-called narrow band light observation (narrow band imaging) is performed in which, by radiating narrow band light compared with the irradiation light at the time of ordinary observation (in other words, white light), predetermined tissue such as a blood vessel at a mucosal surface layer is captured with high contrast. Alternatively, in the special light observation, fluorescence observation for obtaining an image by fluorescence produced by radiating excitation light may be performed. In the fluorescence observation, for example, fluorescence observation in which body tissue is irradiated with excitation light and fluorescence from the body tissue is observed (autofluorescence observation), or fluorescence observation in which a reagent such as indocyanine green (ICG) is locally administered to body tissue and at the same time, the body tissue is irradiated with excitation light corresponding to a fluorescence wavelength of the reagent to obtain a fluorescent image can be performed. The light source apparatus 5157 can be configured such that narrow band light and/or excitation light compatible with such special light observation can be supplied from the light source apparatus 5157.

(Camera Head and CCU)

Referring to FIG. 16, functions of the camera head 5119 and the CCU 5153 of the endoscope 5115 will be described in more detail. FIG. 16 is a block diagram illustrating an example of functional configurations of the camera head 5119 and the CCU 5153 illustrated in FIG. 15.

Referring to FIG. 16, the camera head 5119 has a lens unit 5121, an imaging unit 5123, a driving unit 5125, a communication unit 5127, and a camera head control part 5129 as functions thereof. Furthermore, the CCU 5153 has a communication unit 5173, an image processing unit 5175, and a control part 5177 as functions thereof. The camera head 5119 and the CCU 5153 are connected via a transmission cable 5179 so as to be able to communicate bidirectionally.

First, the functional configuration of the camera head 5119 will be described. The lens unit 5121 is an optical system provided at a connecting portion with the lens barrel 5117. The observation light taken in from the distal end of the lens barrel 5117 is guided to the camera head 5119 and is incident on the lens unit 5121. The lens unit 5121 is constituted by combining a plurality of lenses including a zoom lens and a focus lens. The optical characteristics of the lens unit 5121 are adjusted so as to converge the observation light on a light receiving surface of the imaging element of the imaging unit 5123. Furthermore, the zoom lens and the focus lens are configured such that their positions on an optical axis can move in order to adjust the magnification and focus of the captured image.

The imaging unit 5123 is constituted by the imaging element and is arranged at a subsequent stage of the lens unit 5121. The observation light having passed through the lens unit 5121 is converged on the light receiving surface of the imaging element and an image signal corresponding to the observation image is generated by photoelectric conversion. The image signal generated by the imaging unit 5123 is provided to the communication unit 5127.

For example, an image sensor of the complementary metal oxide semiconductor (CMOS) type capable of capturing a color image having a Bayer array is used as the imaging element constituting the imaging unit 5123. Note that, for example, an imaging element capable of coping with capturing of a high resolution image of 4K or more may be used as the imaging element. Since the image of the surgical site is obtained with high resolution, the operating surgeon 5181 can grasp how the surgical site is in more detail and can progress the surgery more smoothly.

Furthermore, the imaging element constituting the imaging unit 5123 is configured such that the imaging element constituting the imaging unit 5123 has a pair of imaging elements for separately acquiring image signals for right eye and left eye compatible with the 3D display. Owing to that the 3D display is performed, the operating surgeon 5181 can more accurately grasp the depth of the living tissue in the surgical site. Note that, in a case where the imaging unit 5123 is configured as a multi-plate type, the lens units 5121 are also provided as a plurality of systems corresponding to respective imaging elements.

Furthermore, the imaging unit 5123 is not necessarily provided in the camera head 5119. For example, the imaging unit 5123 may be provided inside the lens barrel 5117 immediately behind the objective lens.

The driving unit 5125 is constituted by an actuator and moves the zoom lens and the focus lens of the lens unit 5121 by a predetermined distance along the optical axis under the control of the camera head control part 5129. With this movement, the magnification and the focus of the captured image by the imaging unit 5123 can be appropriately adjusted.

The communication unit 5127 is constituted by a communication apparatus for transmitting and receiving various types of information to and from the CCU 5153. The communication unit 5127 transmits the image signal obtained from the imaging unit 5123 as RAW data to the CCU 5153 via the transmission cable 5179. At this time, in order to display the captured image of the surgical site with low latency, it is preferred that the image signal be transmitted by optical communication. This is because the operating surgeon 5181 performs surgery while observing the state of the affected part with the captured image and thus, for more safe and reliable surgery, the moving image of the surgical site is required to be displayed in real time as much as possible during surgery. In a case where optical communication is performed, a photoelectric conversion module that converts the electrical signal into an optical signal is provided in the communication unit 5127. The image signal is converted into an optical signal by the photoelectric conversion module and then transmitted to the CCU 5153 via the transmission cable 5179.

Furthermore, the communication unit 5127 receives the control signal for controlling driving of the camera head 5119 from the CCU 5153. This control signal may include information regarding imaging conditions, such as information to specify a frame rate of the captured image, information to specify an exposure value at the time of imaging, and/or information to specify the magnification and focus of the captured image, for example. The communication unit 5127 provides the received control signal to the camera head control part 5129. Note that the control signal from the CCU 5153 may also be transmitted by optical communication. In this case, the communication unit 5127 is provided with a photoelectric conversion module that converts the optical signal into an electrical signal; the control signal is converted into an electrical signal by this photoelectric conversion module and then provided to the camera head control part 5129.

Note that the above-mentioned imaging conditions such as the frame rate, exposure value, magnification, and focus are automatically set by the control part 5177 of the CCU 5153 on the basis of the acquired image signal. That is, so-called auto exposure (AE) function, auto focus (AF) function, and auto white balance (AWB) function are equipped in the endoscope 5115.

The camera head control part 5129 controls driving of the camera head 5119 on the basis of the control signal received from the CCU 5153 via the communication unit 5127. For example, the camera head control part 5129 controls driving of the imaging element of the imaging unit 5123 on the basis of information to specify the frame rate of the captured image and/or information to specify exposure at the time of imaging. Furthermore, for example, the camera head control part 5129 appropriately moves the zoom lens and the focus lens of the lens unit 5121 via the driving unit 5125 on the basis of information to specify the magnification and focus of the captured image. The camera head control part 5129 may further include a function of storing information for identifying the lens barrel 5117 and the camera head 5119.

Note that, by arranging constituents such as the lens unit 5121 and the imaging unit 5123 in a hermetically sealed structure having high airtightness and waterproofness, the camera head 5119 is enabled to have resistance to an autoclave sterilization process.

Next, the functional configuration of the CCU 5153 will be described. The communication unit 5173 is constituted by a communication apparatus for transmitting and receiving various types of information to and from the camera head 5119. The communication unit 5173 receives the image signal transmitted from the camera head 5119 via the transmission cable 5179. At this time, as described above, the image signal can be suitably transmitted by optical communication. In this case, a photoelectric conversion module that converts the optical signal into an electrical signal is provided in the communication unit 5173 so as to be compatible with the optical communication. The communication unit 5173 provides the image signal converted into the electrical signal to the image processing unit 5175.

Furthermore, the communication unit 5173 transmits the control signal for controlling driving of the camera head 5119 to the camera head 5119. This control signal can also be transmitted by optical communication.

The image processing unit 5175 carries out various image processes on the image signal, which is RAW data transmitted from the camera head 5119. Examples of these image processes include various known signal processes such as a developing process, a high image quality process (a band enhancement process, a super resolution process, a noise reduction (NR) process, a camera shake correction process, and/or the like), and/or an enlargement process (electronic zoom process). Furthermore, the image processing unit 5175 performs a wave sensing process on the image signal for performing AE, AF, and AWB.

The image processing unit 5175 is constituted by a processor such as a CPU and a GPU and the above-described image processes and wave sensing process can be performed by this processor working in accordance with a predetermined program. Note that, in a case where the image processing unit 5175 is constituted by a plurality of GPUs, the image processing unit 5175 appropriately divides the information associated with the image signal and performs the image processes in parallel by the plurality of GPUs.

The control part 5177 performs various types of control relating to imaging of the surgical site by the endoscope 5115 and display of the captured image obtained by the imaging. For example, the control part 5177 generates a control signal for controlling driving of the camera head 5119. At this time, in a case where the imaging conditions have been input by the user, the control part 5177 generates the control signal on the basis of the input by the user. Alternatively, in a case where the AE function, the AF function, and the AWB function are equipped in the endoscope 5115, the control part 5177 appropriately calculates the optimum exposure value, focal length, and white balance according to the result of the wave sensing process by the image processing unit 5175 and generates the control signal.

Furthermore, the control part 5177 displays the image of the surgical site on the display apparatus 5155 on the basis of the image signal on which the image processes have been carried out by the image processing unit 5175. At this time, the control part 5177 recognizes various objects in the image of the surgical site using various image recognition technologies. For example, the control part 5177 detects the shape, color, and the like of the edge of an object included in the image of the surgical site, thereby being able to recognize a surgical tool such as the forceps, a particular living body part, bleeding, a mist at the time of using the energy treatment instrument 5135, and the like. When displaying the image of the surgical site on the display apparatus 5155, the control part 5177 displays various types of surgery support information superimposed onto this image of the surgical site using results of the recognition. Since the surgery support information is displayed superimposed and presented to the operating surgeon 5181, surgery can be advanced more safely and reliably.

The transmission cable 5179 connecting the camera head 5119 and the CCU 5153 is an electrical signal cable compatible with communication of electrical signals, an optical fiber compatible with optical communication, or a composite cable thereof.

Here, in the illustrated example, communication is performed by wire using the transmission cable 5179; however, communication between the camera head 5119 and the CCU 5153 may be performed wirelessly. In a case where the communication between the camera head 5119 and the CCU 5153 is performed wirelessly, it is no longer necessary to lay the transmission cable 5179 in the surgery room, such that the situation in which the movement of the medical staff in the surgery room is hindered by the transmission cable 5179 can be solved.

An example of the surgery room system 5100 to which the technology according to the present disclosure can be applied has been described thus far. Note that, as an example, a case where a medical system to which the surgery room system 5100 is applied is the endoscopic surgery system 5113 has been described here; however, the configuration of the surgery room system 5100 is not limited to this example. For example, the surgery room system 5100 may be applied to a flexible endoscope system for examination or a microscope surgery system instead of the endoscopic surgery system 5113.

In the configuration described above, the technology according to the present disclosure can be suitably applied to an apparatus that sends out an image that has been captured and an apparatus that displays the sent-out image. Specifically, the camera head 5119 and the CCU 5153 of the endoscope 5115, the ceiling camera 5187, and the surgical field camera 5189 are applied as an apparatus that sends out an image that has been captured, and the centralized operation panel 5111, the audio-visual controller 5107, and the display apparatuses 5103A to 5103D can be applied as an apparatus that displays the image. By applying the technology according to the present disclosure to the surgery room system 5100, highly reliable streaming can be performed; accordingly, the precision of diagnosis can be improved particularly in remote medical treatment performed in real time.

Furthermore, the embodiments according to the present technology are not limited to the aforementioned embodiments and various modifications can be made without departing from the scope of the present technology.

Moreover, the present technology can also be configured as described below.

(1)

A communication system including:

a transmission apparatus that transmits data via a plurality of communication lines; and a reception apparatus that receives the data from the transmission apparatus, in which the transmission apparatus includes:

a quality of service (QoS) module that generates information regarding QoS of the plurality of communication lines;

a load balancer that designates assignment of the data to the communication lines on the basis at least of the information regarding QoS; and a caster that allocates and transmits the data to the assigned communication lines on the basis of an instruction from the QoS module.

(2)

The communication system according to (1), in which the information regarding QoS includes information indicating a communication rate of each of the communication lines.

(3)

The communication system according to (1), in which the information regarding QoS includes an evaluation index that designates whether or not each of the communication line is available.

(4)

The communication system according to any one of (1) to (3), in which the QoS module determines whether or not assignment of the data to each of the communication lines is allowed on the basis of the information regarding QoS.

(5)

The communication system according to (4), in which the QoS module concludes to resume assignment of the data to one of the communication lines determined that assignment of the data is not allowed, on the basis of a result of multiplexing transmission of a packet to the one of the communication lines.

(6)

The communication system according to (5), in which the QoS module estimates a bandwidth of one of the communication lines determined that assignment of the data is not allowed, by multiplexing transmission of the packet, and, in a case where the estimated bandwidth of the one of the communication lines exceeds a predetermined threshold value, concludes to resume assignment of the data to the one of the communication lines.

(7)

The communication system according to any one of (1) to (6), in which in a case where transmission of data via a first communication line is not completed by use time of the data in the reception apparatus, the QoS module determines whether or not transmission of the data via a second communication line is to be completed by the use time.

(8)

The communication system according to (7), in which in a case where it is determined that transmission of data via the second communication line is not to be completed by the use time, and transmission of a part of packets in a packet group constituting one unit of the data has been already completed, the QoS module instructs the caster to transmit all remaining packets of the packet group via the first communication line.

(9)

The communication system according to (8), in which in a case where transmission of the part of the packets in the packet group constituting one unit of the data has not been completed, the QoS module instructs the caster to delete the data.

(10)

The communication system according to any one of (7) to (9), in which
in a case where it is determined that transmission of data via the second communication line is to be completed by the use time, the QoS module instructs the caster to transmit the data via the second communication line.

(11)

The communication system according to any one of (1) to (10), in which
the load balancer designates assignment of the data to a plurality of the communication lines on the basis of at least one of the information regarding QoS or assignment information indicating an assignment status of the data to the communication lines.

(12)

The communication system according to (11), in which the assignment information includes information indicating an assignment status of a piece of the data having a larger data amount than the other pieces of the data, to the communication lines.

(13)

The communication system according to (12), in which the assignment information includes information indicating an assignment status of past data older than the data, to the communication lines.

(14)

The communication system according to any one of (1) to (13), in which
the QoS module determines whether or not retransmission of at least a part of the data is necessary, and
the caster retransmits the at least a part of the data in a case where it is determined that the retransmission is necessary.

(15)

The communication system according to (14), in which the caster retransmits the at least a part of the data by switching the communication lines.

(16)

The communication system according to (14), in which the caster retransmits the at least a part of the data in parallel using a plurality of the communication lines.

(17)

The communication system according to any one of (1) to (16), in which
the communication lines include a wireless communication line.

(18)

The communication system according to any one of (1) to (17), in which
the data includes moving image data.

(19)

The communication system according to any one of (1) to (18), in which
the transmission apparatus is configured as an imaging apparatus that captures a moving image and transmits the captured moving image in real time.

(20)

A transmission apparatus including:
a quality of service (QoS) module that generates information regarding QoS of a plurality of communication lines;
a load balancer that designates assignment of data to the communication lines on the basis at least of the information regarding QoS; and
a caster that allocates and transmits the data to the assigned communication lines on the basis of an instruction from the QoS module.

REFERENCE SIGNS LIST

1 Communication system
11 Transmission apparatus
12 Reception apparatus
13 Control apparatus
20-1, 20-2 Base station
30 Internet
81 Encoder
82 Load balancer
83 QoS module
84 Caster
91 Reception unit
92 QoS module
93 Decoder

The invention claimed is:

1. A communication system comprising:
a transmission apparatus configured to transmit data via a plurality of communication lines; and
a reception apparatus configured to receive the data from the transmission apparatus,
wherein the transmission apparatus includes processing circuitry configured to:
generate information regarding QoS of the plurality of communication lines, and
designate assignment of the data to communication lines of the plurality of communication lines on a basis of at least (i) the information regarding the QoS of the plurality of communication lines and (ii) assignment information indicating an assignment status of a data amount and a communication line transferred in the past,
wherein the transmission apparatus includes communication circuitry configured to allocate and transmit the data to the assigned communication lines of the plurality of communication lines on a basis of an instruction from the processing circuitry.

2. The communication system according to claim 1, wherein the information regarding the QoS includes information indicating a communication rate of each of the communication lines of the plurality of communication lines.

3. The communication system according to claim 1, wherein the information regarding the QoS includes an evaluation index that designates whether each communication line of the plurality of communication lines is available.

4. The communication system according to claim 1, wherein the processing circuitry is configured to determine whether assignment of the data to each communication line of the plurality of communication lines is allowed on a basis of the information regarding the QoS.

5. The communication system according to claim 4, wherein the processing circuitry is configured to resume assignment of the data to one of the communication lines of the plurality of communication lines, in which it is determined that assignment of the data is not allowed, on a basis of a result of multiplexing transmission of a packet to the one of the communication lines of the plurality of communication lines.

6. The communication system according to claim 5, wherein the processing circuitry is configured to:
  estimate a bandwidth of the one of the communication lines, in which it is determined that assignment of the data is not allowed, by multiplexing transmission of the packet, and
  in response to a determination that the estimated bandwidth of the one of the communication lines exceeds a predetermined threshold value, resume assignment of the data to the one of the communication lines.

7. The communication system according to claim 1, wherein in response to a determination that transmission of the data via a first communication line from the plurality of communication lines is not completed by a reproduction time of content included in the data in the reception apparatus, the processing circuitry is configured to determine whether transmission of the data via a second communication line of the plurality of communication lines is to be completed by the reproduction time of the content included in the data.

8. The communication system according to claim 7, wherein in response to a determination that transmission of data via the second communication line is not to be completed by the reproduction time of the content included in the data, and transmission of a subset of packets in a packet group constituting one unit of the data is already completed, the processing circuitry is configured to instruct the communication circuitry to transmit all remaining packets of the packet group via the first communication line.

9. The communication system according to claim 8, wherein in response to a determination that transmission of the subset of the packets in the packet group constituting the one unit of the data is not completed, the processing circuitry is configured to instruct the communication circuitry to delete the data.

10. The communication system according to claim 7, wherein in response to a determination that transmission of data via the second communication line is to be completed by the reproduction time of the content included in the data, the processing circuitry is configured to instruct the communication circuitry to transmit the data via the second communication line.

11. The communication system according to claim 1, wherein the processing circuitry is configured to designate assignment of the data to the plurality of communication lines on a basis of at least one of the information regarding QoS or the assignment information indicating the assignment status of the data to the plurality of communication lines.

12. The communication system according to claim 11, wherein the assignment information further includes information indicating an assignment status of past data older than the data.

13. The communication system according to claim 1, wherein
  the processing circuitry is configured to determine whether retransmission of a subset of the data is necessary, and
  the communication circuitry is configured to retransmit the subset of the data in response to a determination that the retransmission is necessary.

14. The communication system according to claim 13, wherein the communication circuitry is configured to retransmit the subset of the data by switching the communication lines.

15. The communication system according to claim 14, wherein the communication circuitry is configured to retransmit the subset of the data in parallel using the plurality of communication lines.

16. The communication system according to claim 1, wherein the plurality of communication lines include a wireless communication line.

17. The communication system according to claim 1, wherein content included in the data is moving image data.

18. The communication system according to claim 17, wherein the transmission apparatus is configured as an imaging apparatus that captures a moving image as the content included in the data and transmits the captured moving image in real time.

19. A transmission apparatus communication system comprising:
  processing circuitry configured to:
    generate information regarding QoS of a plurality of communication lines, and
    designate assignment of data to communication lines of the plurality of communication lines on a basis of at least (i) the information regarding the QoS of the plurality of communication lines and (ii) assignment information indicating an assignment status of a data amount and a communication line transferred in the past; and
  communication circuitry configured to allocate and transmit the data to the assigned communication lines of the plurality of communication lines on a basis of an instruction from the processing circuitry.

20. A communication method performed in a transmission apparatus, comprising:
  generating, by processing circuitry of the transmission apparatus, information regarding QoS of a plurality of communication lines;
  designating, by the processing circuitry, assignment of data to communication lines of the plurality of communication lines on a basis of at least (i) the information regarding the QoS of the plurality of communication lines and (ii) assignment information indicating an assignment status of a data amount and a communication line transferred in the past; and
  allocating and transmitting, by communication circuitry of the transmission apparatus, the data to the assigned communication lines of the plurality of communication lines on a basis of an instruction from the processing circuitry.

* * * * *